(12) United States Patent
Baker et al.

(10) Patent No.: US 12,179,152 B2
(45) Date of Patent: Dec. 31, 2024

(54) CROSSFLOW MEMBRANE MODULE

(71) Applicant: MEMBRANE TECHNOLOGY AND RESEARCH, INC., Newark, CA (US)

(72) Inventors: Richard W. Baker, Newark, CA (US); Johannes G. Wijmans, Newark, CA (US); Timothy C. Merkel, Newark, CA (US); Karl D. Amo, Newark, CA (US)

(73) Assignee: Membrane Technology and Research, Inc., Newark, CA (US)

( * ) Notice: Subject to any disclaimer, the term of this patent is extended or adjusted under 35 U.S.C. 154(b) by 27 days.

(21) Appl. No.: 17/429,579

(22) PCT Filed: Jan. 21, 2021

(86) PCT No.: PCT/US2021/014262
§ 371 (c)(1),
(2) Date: Aug. 9, 2021

(87) PCT Pub. No.: WO2021/150649
PCT Pub. Date: Jul. 29, 2021

(65) Prior Publication Data
US 2022/0134284 A1 May 5, 2022

Related U.S. Application Data

(60) Provisional application No. 62/963,637, filed on Jan. 21, 2020, provisional application No. 62/963,643, (Continued)

(51) Int. Cl.
*B01D 61/36* (2006.01)
*B01D 53/22* (2006.01)
(Continued)

(52) U.S. Cl.
CPC ......... *B01D 61/368* (2013.01); *B01D 53/228* (2013.01); *B01D 61/362* (2013.01);
(Continued)

(58) Field of Classification Search
None
See application file for complete search history.

(56) References Cited

U.S. PATENT DOCUMENTS

| 4,687,578 A | 8/1987 | Stookey |
| 5,034,126 A | 7/1991 | Reddy et al. |

(Continued)

FOREIGN PATENT DOCUMENTS

| CN | 108043228 A | 5/2018 |
| JP | 46-21444 | 6/1971 |

(Continued)

OTHER PUBLICATIONS

International Search and Written Opinion, PCT/US2021/014261, dated Jun. 10, 2021, 19 pages.
(Continued)

*Primary Examiner* — Krishnan S Menon
(74) *Attorney, Agent, or Firm* — Stinson LLP

(57) ABSTRACT

The present invention relates to a crossflow membrane module configured to separate a feed fluid into a permeate fluid and a residue fluid across one or more membrane sheet(s). The crossflow module comprises a second end offset from a first end along the first direction where an inlet is provided at the first end and an outlet is provided at the second end. The one or more membrane sheet(s) each have a first portion and a second portion. A conduit is adjacent to the first side of each membrane sheet and is configured to receive and output the permeate fluid separated from the feed fluid. The second portion of the membrane sheet has a greater permeance for a major component than the first portion such that the second part of the permeate fluid, which is generated by separation across the second portion of the membrane sheet, has a higher concentration of the major component than the first part of the permeate fluid, which is generated by separation across the first portion. The
(Continued)

Enlarged view of coating tray second portion is spaced apart from the first side of the membrane sheet along the second direction thereby causing the second part of the permeate gas to flow towards the first side of the membrane sheet such that the second part of the permeate gas mixes with the first part of the permeate gas thereby reducing the concentration of the minor component in the first part of the permeate gas.

29 Claims, 20 Drawing Sheets

Related U.S. Application Data filed on Jan. 21, 2020, provisional application No. 62/963,639, filed on Jan. 21, 2020.

(51) Int. Cl.
*B01D 63/08* (2006.01)
*B01D 63/10* (2006.01)
*B01D 67/00* (2006.01)
*B01D 69/06* (2006.01)

(52) U.S. Cl.
CPC ....... *B01D 63/084* (2013.01); *B01D 63/1031* (2022.08); *B01D 63/107* (2022.08); *B01D 67/0088* (2013.01); *B01D 69/06* (2013.01); *B01D 2256/10* (2013.01); *B01D 2256/245* (2013.01); *B01D 2257/504* (2013.01); *B01D 2311/13* (2013.01); *B01D 2313/08* (2013.01); *B01D 2313/143* (2013.01); *B01D 2313/146* (2013.01); *B01D 2319/06* (2013.01)

(56) References Cited

U.S. PATENT DOCUMENTS

| | | | |
|---|---|---|---|
| 5,096,584 | A | 3/1992 | Reddy et al. |
| 5,580,452 | A | 12/1996 | Lin |
| 6,068,771 | A | 5/2000 | McDermott et al. |
| 6,136,073 | A | 10/2000 | Coan et al. |
| 6,299,772 | B1 | 10/2001 | Huschke |
| 8,496,825 | B1 | 7/2013 | Jons et al. |
| 2005/0092683 | A1 | 5/2005 | Goldsmith |
| 2013/0199988 | A1 | 8/2013 | Jons et al. |
| 2013/0334128 | A1 | 12/2013 | Takagi et al. |
| 2014/0230649 | A1 | 8/2014 | Cao |
| 2015/0068971 | A1 | 3/2015 | Koiwa et al. |
| 2018/0133643 | A1 | 5/2018 | Ho et al. |
| 2020/0047129 | A1 | 2/2020 | Tasaki et al. |

FOREIGN PATENT DOCUMENTS

| | | |
|---|---|---|
| JP | 62-57630 A | 3/1987 |
| JP | 2000-342939 A | 12/2000 |
| JP | 2015136634 A | 7/2015 |
| WO | 1997/19454 A1 | 5/1997 |
| WO | 2015175257 A1 | 11/2015 |
| WO | 2019065493 A1 | 4/2019 |
| WO | 2019075370 A1 | 4/2019 |
| WO | 2020012018 A1 | 1/2020 |

OTHER PUBLICATIONS

International Search and Written Opinion, PCT/US2021/014262, dated Apr. 7, 2021, 13 pages.

(a)

(b)

(a)

(b)

(c)

(a)

(b)

(c)

CROSSFLOW MEMBRANE MODULE

BACKGROUND

The present invention relates to a crossflow membrane module, and a method for making the same. The crossflow membrane module is particularly useful for pervaporation and gas separation applications.

In the text that follows, the concentration of components used are molar concentrations unless otherwise stated. The term "major component" refers to the component that has the highest concentration in the feed fluid, while the term "minor component" refers to the component that has a lower concentration than the major component in the feed fluid. The "minor component" is enriched in the permeate fluid by the membrane separation processes and is the target component of the separation processes. The term "fluid" may refer to gas and/or liquid.

In a separation module, a feed fluid containing a major component and a minor component, the major component having a higher concentration than the minor component is separated across a membrane into a permeate flow and a residue flow. The residue fluid has a lower concentration of the minor component than the feed fluid and the permeate fluid has a higher concentration of the minor component than the feed fluid. In a cross-flow module, the permeate flow is predominantly transverse, preferably perpendicular, to the feed flow. In a counterflow module, the permeate flow is predominantly in the opposite direction from the feed flow.

A known crossflow separation device is shown in FIG. 1. In a crossflow separation device, the flow of the feed is in a first direction (left to right in FIG. 1) and the flow of permeate is in a second direction, transverse to the first direction (downwards in FIG. 1). The concentration of the most permeable components in the feed decreases as the feed flows along the membrane surface in the first direction (i.e. left to right). Consequently, the concentration of the most permeable components in the permeate also decreases along the first direction. In a crossflow module, the permeate gas flow has the same concentration as the incoming permeate and mixing does not affect the membrane separation.

It is known to use external sweep to increase the driving force across the membrane and so improve efficiency for crossflow modules. A sweep gas introduced at the outlet end of the module dilutes the most permeable component at all points towards the inlet. This dilution increases the concentration difference of the most permeable component across the membrane and consequently increases the driving force for the separation across the membrane. This effect is known as sweep. This increase in driving force improves efficiency such that a smaller membrane area can be used.

External sweep uses a gas stream generated externally to the module that is injected into the permeate flow proximal to the outlet to generate a sweep effect. Such systems are shown in FIG. 3 and are described in further detail later in the application. As shown in FIG. 3(b), the residue fluid may be expanded across a valve 320 before being introduced to the permeate flow at the outlet end. For example, it is known to pass a portion of the treated residue fluid through a valve and introduce this to the permeate side of the module. However, such systems require additional piping and valves to control the sweep flow rate for reliable operation, which leads to increased costs. Furthermore, such modules would be employed in large numbers in an industrial plant thereby requiring many control units, the failure of any one leading to a large uncontrolled leak of gas from the residue to the permeate stream affecting the operation of the whole plant.

The devices shown in FIGS. 4 and 5 attempted to address the issues concerning modules where the sweep gas is generated externally by instead generating the sweep gas flow internally. The device shown in FIG. 4 is a counterflow hollow fiber module device where the fiber is coated with a selective layer 401 except for a bare end portion 403. The bare end portion has a much higher permeance than the main portion of the fiber but no selectivity. Therefore, the feed fluid would permeate through the bare end and act as a flow of sweep gas 409 generated internally. The device shown in FIG. 5 is also a counterflow hollow fiber module. The feed fluid 502 flows left to right in in the spaces between the hollow fibers 505. A residue pipe extends through the module and terminates before the right-hand end of the module 509. A portion of the feed fluid permeates the fiber membrane and travels inside the fiber in the opposite direction to the feed flow. The feed fluid that does not permeate the membrane is removed through holes in the residue collection pipe. The end of the residue collection pipe is sealed with a plug perforated by an orifice 511. A portion of the treated residue fluid leaks through this orifice and can then enter the open ends of the fibers 514 acting as a sweep gas.

The use of internal sweep has been limited to counterflow hollow fiber separation modules. Internal sweep has not been applied to crossflow separation modules comprising membrane sheets, such as plate-and-frame modules or spiral-wound modules due to construction and operation difficulties. The present invention seeks to apply the advantages of internally generated sweep to crossflow modules comprising flat membrane sheets.

SUMMARY

According to the invention there is provided a crossflow membrane module and a method for making the module as defined by the claims.

As set out in claim 1, there is provided a crossflow membrane module configured to separate feed fluid comprising a minor component and a major component into permeate fluid and residue fluid. The residue fluid has a lower concentration of the minor component than the feed fluid and the permeate fluid has a higher concentration of the minor component than the feed fluid. The module comprises a housing having a first end and a second end, wherein the second end is spaced apart from the first end along the first direction. The module further comprises one or more membrane sheet(s) between the first and second ends of the housing, wherein the one or more membrane sheet(s) comprise a first end and a second end, wherein the second end is spaced apart from the first end along the first direction. Each membrane sheet comprises first and second sides between the first and second ends. The first side is spaced apart from the second side along a second direction, wherein the second direction is transverse to the first direction. Each membrane sheet comprises a first major surface and a second major surface, wherein the second major surface is opposite from the first major surface, wherein each membrane sheet is configured to separate the feed fluid into the residue fluid and the permeate fluid. The membrane module is configured such that the feed fluid and the residue fluid flow along the first major surface of each membrane sheet in the first direction but do not flow along the second major surface of each membrane sheet and the permeate fluid flows along the second major surface of each membrane sheet but does not flow along the first major surface of each membrane sheet. The membrane module further comprises an inlet at the first end of the housing, wherein the inlet is in fluid communication with the first end of the first major surface of each membrane sheet and is configured to deliver the feed fluid such that it flows along the first major surface of each membrane sheet. The membrane module further comprises an outlet at the second end of the housing, wherein the outlet is in fluid communication with the second end of the first major surface of each membrane sheet and is configured to receive and output the residue fluid separated from the feed fluid. The membrane module further comprises a conduit in fluid communication with the first side of the second major surface of the membrane sheet, wherein the conduit is configured to receive and output the permeate fluid separated from the feed fluid. At least one of the one or more membrane sheet(s) comprises a first portion and a second portion such that separation of the feed fluid across the first portion generates a first part of the permeate fluid and separation across the second portion generates a second part of the permeate fluid. The second portion of the membrane sheet has a greater permeance for the major component than the first portion such that the second part of the permeate fluid has a higher concentration of the major component than the first part of the permeate fluid. The second portion is spaced apart from the first side of the membrane sheet along the second direction thereby causing the second part of the permeate fluid to flow towards the first side of the membrane sheet such that the second part of the permeate fluid mixes with the first part of the permeate fluid thereby reducing the concentration of the minor component in the first part of the permeate fluid.

Accordingly, in the present invention, the second part of the permeate fluid acts as a sweep fluid, diluting the concentration of the minor component in the permeate fluid closer to the first side. By diluting the concentration of the minor component in the permeate fluid, the concentration gradient across the membrane for the minor component is increased. The increase in concentration gradient leads to an increase in driving force for the separation of the feed fluid across the membrane into the permeate fluid and the residue fluid. The second part of the permeate fluid is also referred to in the specification as sweep gas/sweep flow/sweep fluid. The present invention therefore does not require valves or piping to control the flow and supply of feed fluid, since this is generated internally.

The one or more membrane sheet(s) are flat i.e. planar.

The feed fluid flows along the major surface of the membrane in the first direction. The feed fluid is separated into the permeate fluid and the residue fluid. The residue fluid also flows along the major surface of the membrane in the first direction. The permeate fluid comprises the portion of the feed fluid that passes through the membrane and typically flows along the opposite major surface of the membrane from the feed fluid and the residue fluid. In the present application, the major surface of the membrane, along which the residue and feed fluid flows, is termed the first major surface and the major surface of the membrane, along which the permeate fluid flows, is termed the second major surface. The first major surface may also be considered to be the feed side of the membrane and the second major surface may be considered to be the permeate side of the membrane. The second major surface opposes the first major surface. In other words, the second major surface is separated from the first major surface by the thickness of the membrane sheet. In the present invention, at least a portion of the permeate fluid flows in the direction from the second side towards the first side (i.e. in a direction transverse, specifically perpendicular, to the first direction).

For each membrane sheet, the fluid path along the first major surface between the inlet and the outlet is fluidly sealed from the fluid path along the second major surface to the conduit such that fluid can only pass from the first major surface to the second major surface through the membrane sheet. The sealing prevents leaks that would cause mixing of the feed/residue fluid on the first major surface of the membrane sheet with permeate fluid on the second major surface of the membrane sheet. The seals also serve to separate the fluids going into and out of the module from the outside environment. The seal may be achieved by using adhesive, such as epoxy glue or equivalent sealing material, adhesive tape or heat sealing.

The one or more membrane sheet(s) extend between the first and second ends of the housing such that the first end of the one or more membrane sheet(s) is proximal to the first end of the housing and the second end of the one or more membrane sheet(s) is proximal to the second end of the housing. Preferably, the housing may be cylindrical in shape where the first direction defines a diameter of the housing and the first and second ends are diametrically opposed.

The first and second ends and the first and second sides of the one or more membranes sheet(s) form outer edges of the one or more membrane sheet(s). The first and second ends of the one or more membrane sheet(s) form the outer edges of the one or more membrane sheet(s) spaced apart along the first direction. The first and second sides of the one or more membranes sheet(s) form the outer edges of the one or more membrane sheet(s) spaced apart along the second direction.

As discussed above, the conduit is configured to receive and output the permeate fluid. The conduit is fluidly connected to the first side of the second major surface of one or more of the membrane sheet(s) where the second major surface is opposite from the first major surface. Preferably, all of the membrane sheet(s) are fluidly connected to the conduit via the first side of their second major surface. The conduit may be a first conduit of a plurality of conduits. The conduit may be open to receive permeate fluid from the second major surface along at least 50% of its length in the axial direction. The conduit typically comprises openings/apertures to receive the permeate fluid. The axial range of openings/apertures in the conduit in the first direction overlap and are preferably approximately the same as the axial range of the second portion. The openings/apertures in the conduit may have the same axial range as the length of the membrane sheet in the first direction. The conduit may along at least 50%, preferably at least 70%, more preferably at least 80% of the length of the first side in the first direction. The conduit may extend along the entire length of the first side in the first direction. The axial range of the openings/apertures in the conduit may extend along at least 50%, preferably at least 70%, more preferably at least 80%, most preferably 100% of the length of the first side in the first direction. The conduit is typically aligned with the first side of each membrane sheet. More specifically, the aperture(s)/opening(s) in the conduit are typically aligned with the first side of each membrane sheet.

The module may further comprise a second conduit fluidly coupled to the second side of the membrane. The second conduit is also typically fluidly connected to a second major surface of the one of more membrane sheet(s) where the second major surface is opposite from the first major surface.

In a configuration comprising both first and second conduits, the permeate fluid can flow to both the first and second conduits on the first and second sides where it will be received and output from the module.

At least one of the one or more membrane sheets comprises the first portion and the second portion. The second portion of the membrane has a higher permeance for the major component than the first portion. Preferably, the permeance of the second portion to the major component is at least twice the permeance of the first portion to the major component. More preferably, the permeance of the second portion to the major component is at least ten times the permeance of the first portion to the major component. The first portion of the membrane sheet has selectivity such that it is selective for the minor component over the major component. The second portion may be a portion of uncoated membrane sheet having no selectivity to the components of the feed fluid but still able to regulate the flow of unseparated feed fluid from the first major surface (the feed side) to the second major surface (the permeate side). However, the second portion of the membrane sheet may have selectivity such that it is also selective for the minor component over the major component. If the second portion is also selective for the separation being performed, this is beneficial, but is not required. If the second portion is also selective for the separation being performed, then the second portion of the membrane has lower selectivity than the first portion.

The second portion may form a part of the second major surface of the membrane sheet(s) but not the first major surface. Alternatively, the second portion may form a part of the first major surface of the membrane sheet(s) but not the second major surface. By way of further alternative, the second portion may form a part of both the first and the second major surfaces of the membrane sheet(s). The first portion may form a part of the second major surface of the membrane sheet(s) but not the first major surface. Alternatively, the first portion may form a part of the first major surface of the membrane sheet(s) but not the second major surface. By way of further alternative, the first portion may form a part of both the first and the second major surfaces of the membrane sheet(s). In a preferred arrangement, the first portion forms part of the first major surface and the second portion also forms part of the first major surface. If the first portion and the second portion form part of the same major surface, then the first portion may form the remainder of the major surface that does not form the second portion. If the first portion and the second portion form part of opposite major surfaces, then the first portion and the second portion do not overlap.

The first and second portions may be formed by coating the membrane sheet with first and second coatings, respectively. More specifically, the first portion may be formed by coating the relevant section of the membrane sheet with a first coating and the second portion may be formed by coating the relevant section of the membrane with a second coating. The second coating can be thinner than the first coating or can be made of a different, more permeable coating material. The objective is to make a second portion that has a higher permeance for the major component of the feed fluid than the first portion. The second coating may have a different composition from the first coating.

The first and/or second coatings may be applied to the second major surface of the one or more membrane sheets but not the first major surface of the one or more membrane sheets. Alternatively, the first and/or second coatings may be applied to the first major surface but not the second major surface of the one or more membrane sheets. In some embodiments, the first and/or second coatings may be applied to both the first major surface and the second major surface of the one or more membrane sheet(s). In some arrangements, the first coating may be applied to the first major surface and the second coating may be applied to the second major surface (i.e. such that the second portion extends along/forms part of the second major surface and the first portion extends along/forms part of the first major surface). In further alternative arrangements, the first coating may be applied to the second major surface and the second coating may be applied to the first major surface (i.e. such that the second portion extends along/forms part of the first major surface and the first portion extends along/forms part of the second major surface). If the first coating is applied to an opposite major surface from the second coating, then the area coated by the first coating does not overlap with the area coated by the second coating. In some arrangements, the first portion may be formed by coating the relevant section of the membrane sheet with the first coating and the second portion may be a section of uncoated membrane sheet having no selectivity to the components of the feed fluid but still able to regulate the flow of unseparated feed fluid from the first major surface (the feed side) to the second major surface (the permeate side).

Alternatively, the first portion may be formed by cutting the first portion from a first membrane material and the second portion may be formed by cutting the second portion from a second membrane material. The second membrane material has a higher permeance for the major component than the first membrane material. The first membrane material may have a higher selectivity than the second membrane material. The first and second portions may be sealed together. For example, using an adhesive. In this arrangement, the second portion extends forms part of both the first and second major surfaces of the membrane sheet and the first portion forms part of both the first and second major surfaces of the membrane sheet.

The second portion is spaced apart from the first side of the membrane sheet along the second direction. The second portion of the membrane sheet may extend along an outer edge of the one or more membrane sheet(s). The second portion may extend along at least a portion of the second side. The second portion may extend along the entire edge formed by the second side. The second portion may be formed as a strip having its length extending along the first direction. The area of the second portion is less than 50% of the total area of the membrane sheet, typically less than 20% of total area of the membrane sheet, preferably less than 15% of the total area of the membrane sheet, more preferably less than 10%, most preferably less than 6% of the total area of the membrane sheet. Preferably, the area of the second portion is 1% to 14% of the total area of the membrane sheet. The remaining area of the membrane sheet forms the first portion. Accordingly, the second portion is adjacent to the first portion.

The area of the second portion (the sweep-generating region) of the membrane can be varied over a wide range. The permeance of the sweep-generating region can also be varied by changing the material used and the thickness of the membrane. Thus, the size of the sweep effect can be easily controlled by adjusting the membrane manufacturing process. Once the membrane module has been made, generation of the sweep effect can be completely automatic, no control valves and the like are required.

In the embodiment where first and second conduits are employed as discussed above, the second portion may be spaced apart from both the first and second sides. The second portion may formed as a strip having is length extending along the first direction. The second portion may be equidistant from both the first and second sides.

The membrane module may further comprise one or more feed spacers configured to space apart the one or more membrane sheets wherein each feed spacer is for defining a fluid path for the flow of feed fluid and residue fluid to the outlet. The membrane module may further comprise one or more permeate spacers configured to space apart the one or more membrane sheets, wherein each permeate spacer is for defining a fluid path for the flow of permeate fluid to the conduit.

The permeate spacers and feed spacers may have first and second ends and first and second sides corresponding to the first and second ends and first and second sides of the membrane sheets, respectively. In other words, the second end of each spacer is spaced apart from the first end along the first direction. The first side of each spacer is spaced apart from the second side along a second direction, wherein the second direction is transverse to the first direction.

The permeate spacers and the feed spacers are permeable. The fluid path for the feed fluid and the residue fluid along the first major surface of the membrane sheet is through the feed spacer. The fluid path for the permeate fluid along the second major surface of the membrane sheet is through the permeate spacer.

A first membrane sheet of the one or more membrane sheets may be arranged such that a feed spacer is adjacent to the first major surface of the first membrane sheet and a permeate spacer is adjacent to the second major surface of the first membrane sheet. The feed spacer is typically in direct contact with the first major surface of the first membrane sheet and the permeate spacer is typically in direct contact with the second major surface of the second membrane sheet.

The membrane sheets, the one or more feed spacers and the one or more permeate spacers may arranged in a stacked configuration, wherein each space between adjacent membrane sheets is defined by either a feed spacer or a permeate spacer, wherein the membrane sheets are arranged in alternating orientations such that the first major surface of each membrane sheet is in contact with a feed spacer and the second major surface of each membrane sheet is in contact with a permeate spacer.

Adjacent membrane sheets spaced apart by a feed spacer may be sealed along the first and second sides of their first major surface (the feed side) to fluidly seal the fluid path for the flow of feed fluid and residue fluid along the first major surfaces. Adjacent membrane sheets spaced apart by a permeate spacer are sealed along their first and second ends and second sides of their second major surface (the permeate side) to fluidly seal the fluid path for the permeate fluid along the second major surfaces. The seals may be achieved by, for example, using o-rings, adhesive or heat sealing. The feed spacers may also be sealed along their first and second sides, which correspond to the first and second sides of the membrane sheets. Similarly, the permeate spacers may also be sealed along their first and second ends and second sides, which correspond to the first and second ends and second sides of the membrane sheets. In one optional arrangement, the first major surfaces of adjacent membrane sheets may be sealed together along their first and second sides. Similarly, the second major surfaces of adjacent membrane sheets may be sealed together along their first and second ends and second sides.

Membrane sheets may be folded around the feed spacer thereby forming a pair of membrane sheets where the first major surface of each membrane sheet is adjacent to the feed spacer. In other words, the first major surface of each membrane sheet is facing each other and spaced apart by the feed spacer therebetween. In this arrangement, the seal is provided by the fold between the first side of each of the pair of membrane sheets.

Each feed spacer may be configured to direct the flow of fluid along the first direction and each permeate spacer may be configured to direct the flow of fluid along the second direction. The feed and permeate spacers may have grooves to direct the flow of fluid. For example, the grooves may be formed in the surface of the feed and permeate spacers. The feed spacer and the permeate spacer may be orientated such that the grooves in the feed spacer extend along the first direction and the grooves in the permeate spacer extend along the second direction. Alternatively, the feed and permeate spacers may be corrugated to direct the flow of fluid. The corrugated feed and permeate spacers may have ridges to direct the flow of fluid. The corrugated feed spacers may be orientated such that the longitudinal direction of the ridges is parallel to the first direction. The corrugated permeate spacers may be orientated such that the longitudinal direction of the ridges is parallel to the second direction. By way of further alternative, to direct the flow of fluid, the feed spacers and the permeate spacers may be formed of a material having a different permeability in different directions. This difference in permeability may be achieved by the weave of the fibres in the material used to form the spacer. The feed spacer may be orientated such that the high permeance direction (i.e. low flow resistance) is parallel to the first direction. The permeate spacer may be orientated such that the high permeance area (i.e. low flow resistance) is parallel to the second direction.

The spacers may have a thickness of approximately 0.03 to 0.06 inches. The spacers may be formed of a woven material that may be impregnated with a resin and then calendared to make the surface smooth or grooved.

The feed and permeate spacers typically extend over the same area as the membrane sheet. The crossflow membrane module may be spiral-wound. In such an embodiment, the conduit is a central tube extending along the first direction. The one or more membrane sheet(s) are wound around the central tube so as to define a spiral perpendicular to the first direction, such that the first side of the one or more membrane sheet(s) is closer to the central tube than the second side. The central tube comprises a cylindrical surface and first and second terminal ends defining a lumen therebetween. The central tube comprises one or more opening(s) in the cylindrical surface, wherein the one or more opening(s) are configured to receive the permeate fluid separated from the feed fluid. The one or more opening(s) are in fluid communication with the first side of the membrane sheet. The central tube further comprises an outlet configured to output the permeate fluid received by the one or more opening(s), wherein the outlet is in the first or second terminal ends of the central tube.

The one or more opening(s) may be spaced apart from each other. Preferably, the one or more opening(s) are spaced apart along the first direction. The second portion typically extends over the same axial range as the one or more opening(s) in the first direction. The second portion overlaps with and is typically directly aligned with the one or more opening(s) in the first direction.

The central tube provides a flow path for the permeate fluid which is received by the one or more opening(s) such that is then flows within the lumen of the central tube along the longitudinal direction of the tube towards and out of the outlet in the first or second terminal ends.

The crossflow membrane module may also be a plate-and-frame module. Plate and Frame modules include a stack of membranes sheets. The membrane sheets are typically separated from each other by the feed spacers and permeate spacers. The stack of membrane sheets separated by the feed spacers and permeate spacers may be compressed between two end plates connected together by a frame. O-ring seals or adhesive sealing layers may be used to contain fluids within the module and to separate the fluid on the first major surface of each membrane sheet (the feed side) from the fluid on the second major surface (permeate side) of each membrane sheet. Ducts may be provided around the edges of the module to introduce and remove fluid from the first and second major surfaces of each membrane sheet.

The present invention also relates to a method of manufacturing the membrane sheets of the membrane module described above. The method comprises providing a roll of precursor sheets, coating a first area of the roll of precursor sheets with a first coating solution and coating a second area of the roll of precursor sheets with a second coating solution to form the roll of membrane sheets. The method further comprises separating the one or more roll(s) of membrane sheets into separate membrane sheets where the first portion of each membrane sheet is formed by the first area of the roll of membrane sheets and the second portion of each membrane sheet is formed by the second area of the roll of membrane sheets, wherein the second portion of each membrane sheet has a higher permeance for the major component than the first portion.

The first coating solution may have the same composition as the second coating solution. In this embodiment, the second area may have a thinner coating of the coating solution than the first area such that the second portion has a higher permeance than the first portion.

The first coating solution may have a different composition than the second coating solution. The first coating solution may have a lower permeability for the major component than the first portion.

The step of coating the first area of the roll of precursor sheets with the first coating solution and coating the second area of the roll of precursor sheets with the second coating solution may be performed for both the first and second major surfaces. Alternatively, the step of coating the first area of the roll of precursor sheets with the first coating solution and coating the second area of the roll of precursor sheets with the second coating solution may be performed for both the first and second major surfaces may be performed for only the first major surface.

The first area and the second area may be adjacent to each other. Preferably, the second area is positioned between two first areas such that, in each membrane sheet, the second portion is formed as a strip and the first portions are provided on either side of the second portion.

The method may further comprise folding each membrane sheet around a feed spacer such that each membrane sheet forms a pair of membrane sheets (i.e. a membrane sheet on an upper side of the spacer and a membrane sheet on a lower side of the spacer). The first major surface of each membrane sheet is adjacent to the feed spacer. In other words, the first major surface of each membrane sheet is facing each other and spaced apart by the feed spacer therebetween.

The method may further comprise sealing two membrane sheets together along their first side and positioning a feed spacer therebetween. The surfaces of the membrane sheets adjacent to the feed spacer are the first major surfaces.

The step of coating the first area and the step of coating the second area may be performed simultaneously.

The coating steps may be performed by contacting the roll of membrane sheets with first and second solutions in a coating container, wherein the coating container has first and second sections fluidly separated from each other by separators, the first section containing the first coating solution and the second section containing the second coating solution. The method may further comprise moving the position of the separators to adjust the position and size of the second portion. Preferably, the second section of the coating container is positioned between two first sections of the coating container.

The step of coating the first area and the step of coating the second area may be performed in separate steps.

Another aspect of the invention relates to a method of using the crossflow membrane module described above to separate a minor component from a feed flow comprising a major component and a minor component. The method may comprise flowing a feed fluid comprising the major component and the minor component through the inlet and along the first major surface of each membrane sheet. The method may further comprise separating the feed fluid into permeate fluid and residue fluid across the membrane sheet, wherein the residue fluid has a lower concentration of the minor component than the feed fluid and the permeate fluid has a higher concentration of the minor component than the feed fluid. The step of separating the feed fluid across the membrane sheet may comprise separating the feed fluid across the first portion of the membrane sheet to generate the first part of the permeate fluid and separating the feed fluid across the second portion of the membrane sheet to generate the second part of the permeate fluid. The method may further comprise outputting the permeate fluid from the crossflow membrane module via the conduit and outputting the residue fluid from the crossflow membrane module via the outlet. The feed fluid may comprise methane and carbon dioxide where methane is the major component and carbon dioxide is the minor component such that the method is a method of separating carbon dioxide from methane. Instead, the feed fluid may comprise nitrogen and carbon dioxide where nitrogen is the major component and carbon dioxide is the minor component such that the method is a method of separating carbon dioxide from nitrogen.

For a better understanding of the invention and to show how the same may be put into effect, reference will now be made, by way of example only, to the accompanying drawings, in which.

Figure 3:
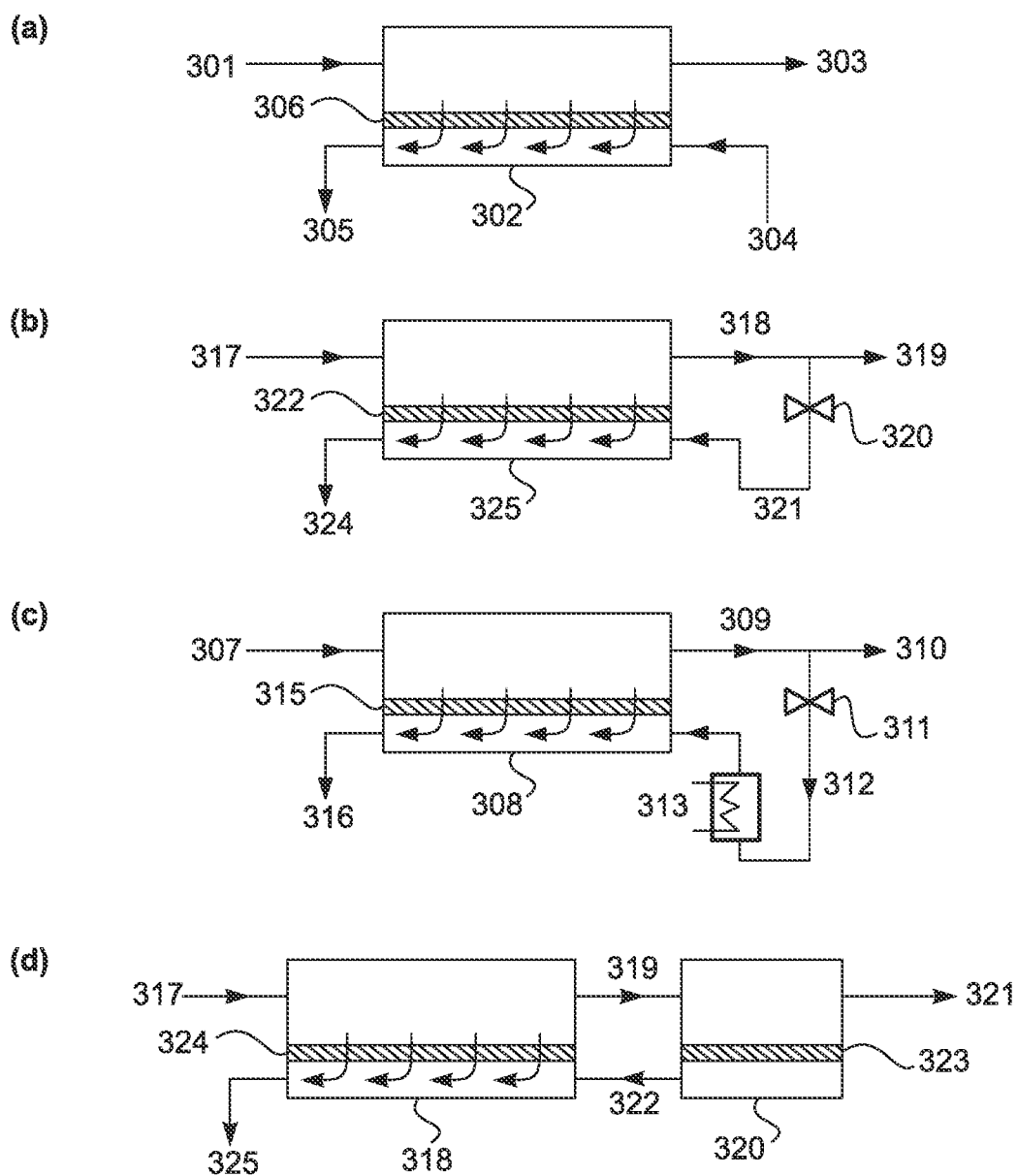

FIGS. 3(*a*) to 3(*d*) are schematic diagrams of known counterflow membrane module configurations which generate a sweep gas flow externally.

Figure 4:
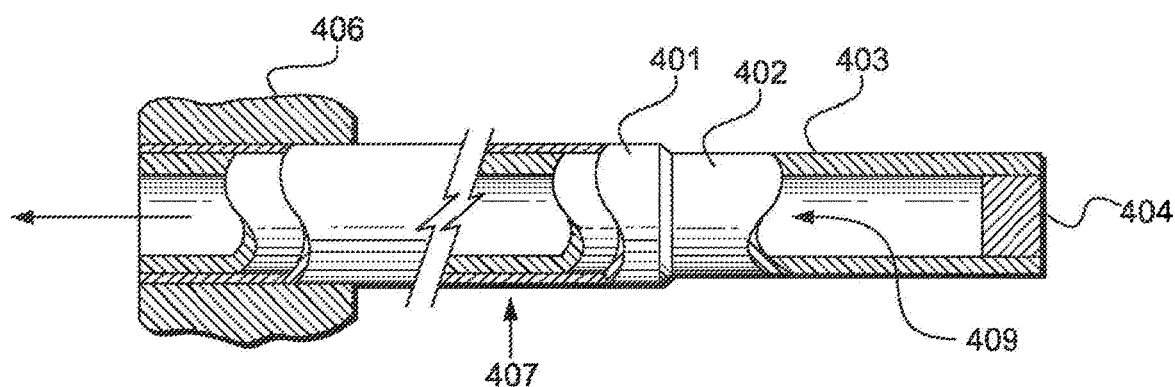
Figure 4:
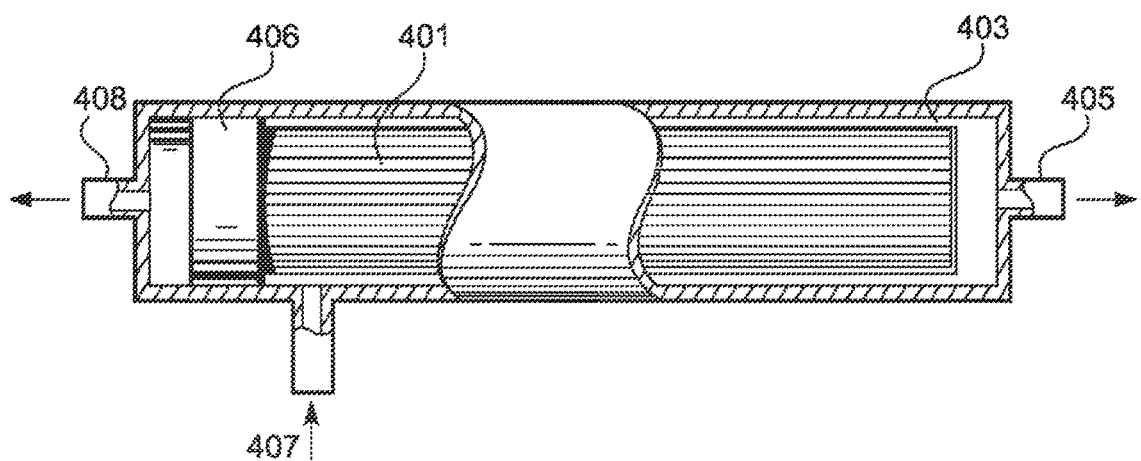

FIGS. 4(*a*) and (*b*) are schematic illustrations from U.S. Pat. No. 4,687,578 and depict a known hollow fiber membrane module that employs a sweep flow generated internally.

Figure 5:
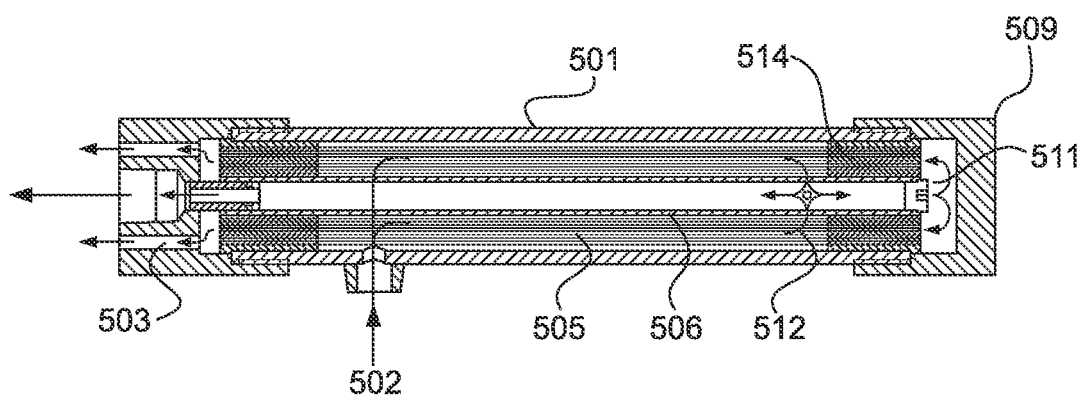

FIG. 5 is a schematic illustration from U.S. Pat. No. 6,740,140 and depict a known hollow fiber membrane module that employs a sweep flow generated internally.

Figure 6:
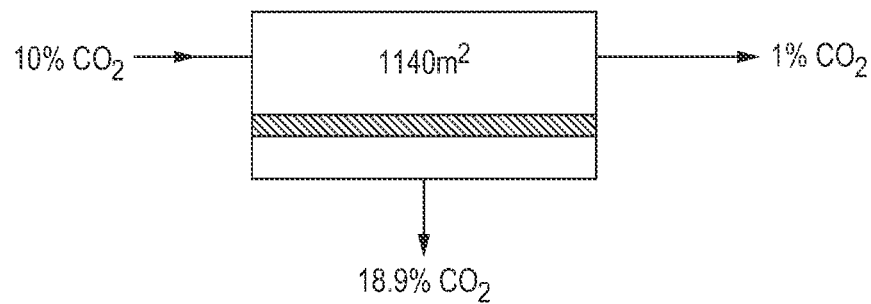
Figure 6:
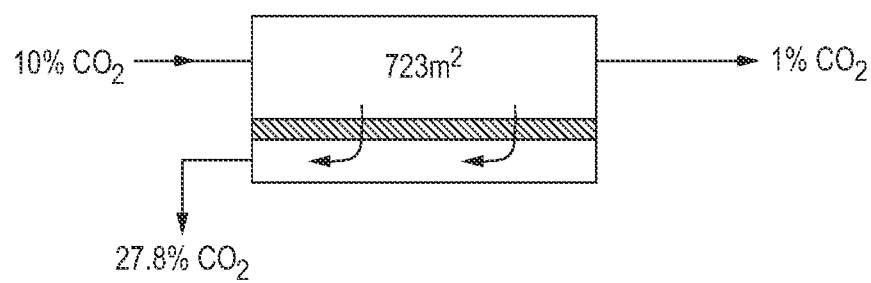
Figure 6:
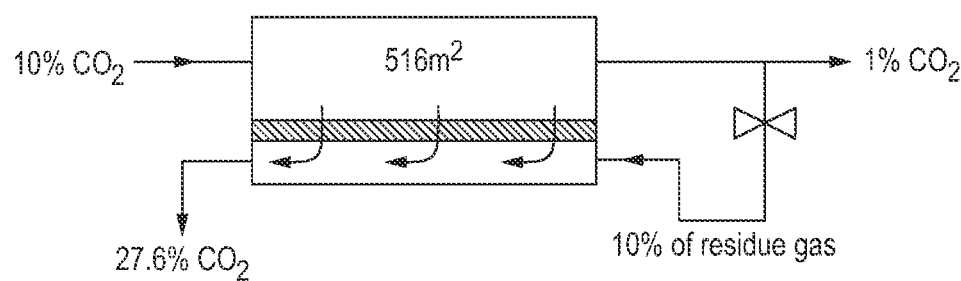

FIGS. 6(*a*) to 6(*c*) are schematic diagrams that include example calculations demonstrating the effect of module flow configuration on a separation which is within the pressure ratio limited region.

FIG. 6(a) illustrates a cross-flow membrane module, FIG. 6(b) illustrates a counterflow membrane module and FIG. 6(c) illustrates a counterflow membrane module while employs a sweep flow generated externally.

FIGS. 7(a) to (c) are schematic diagrams that include example calculations demonstrating the effect of module flow configuration on a separation which is partially outside the pressure ratio limited region.

Figure 8:
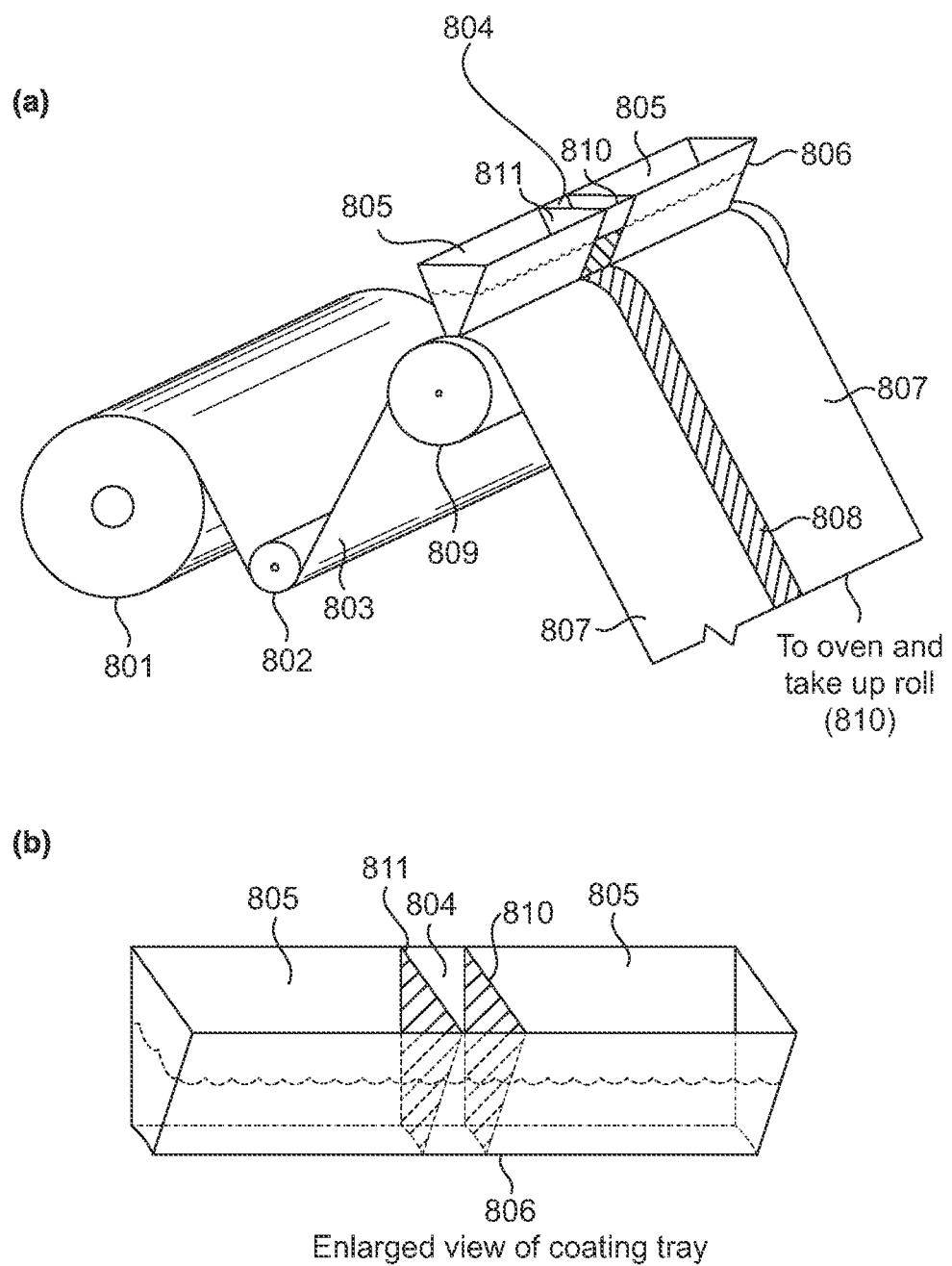

FIG. 8 is a schematic illustration of a coating process that can be used to form membrane sheets in accordance with the invention where each membrane sheet has first and second portions.

Figure 9:
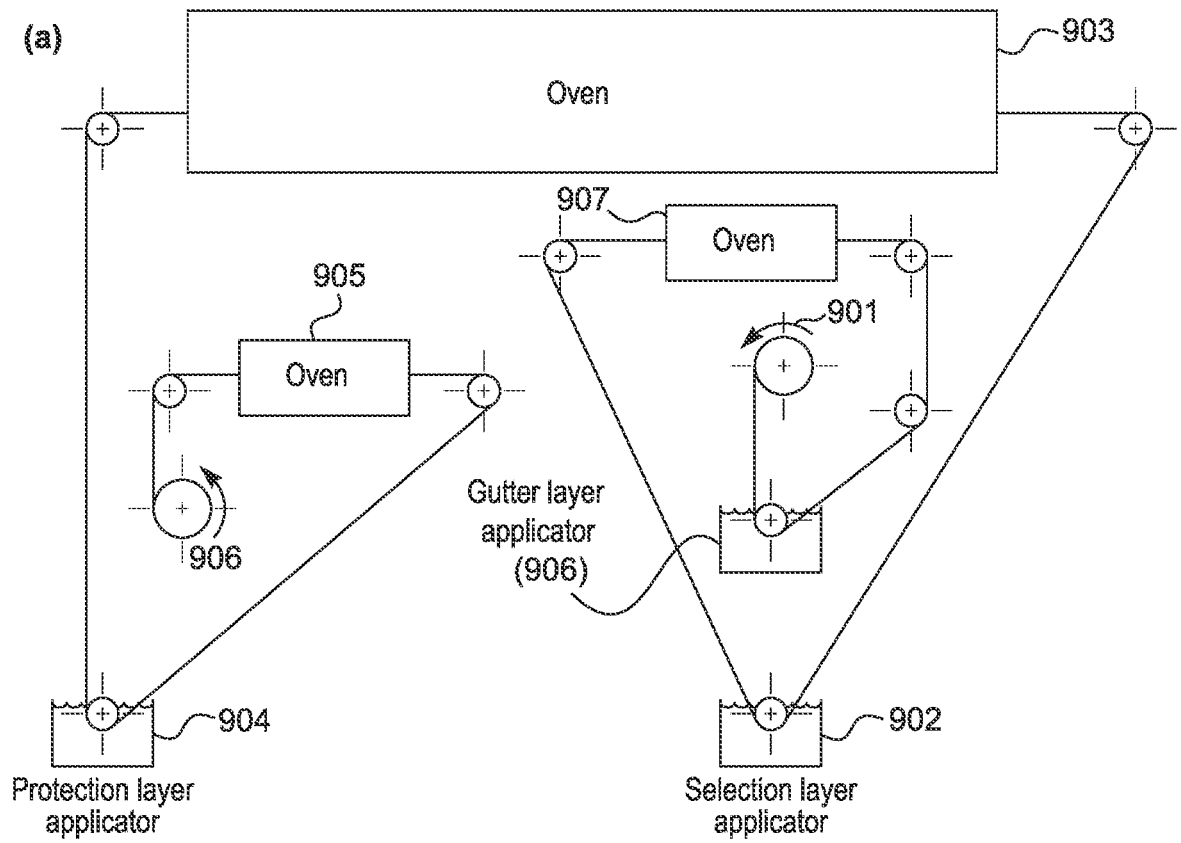
Figure 9:
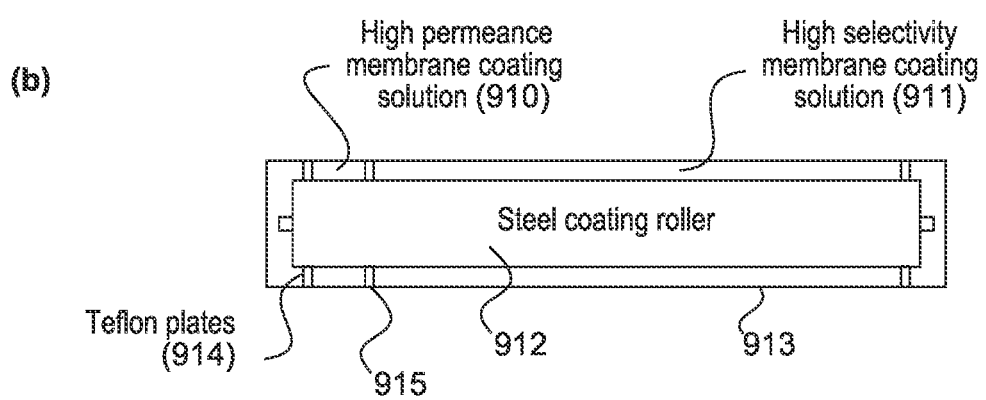

FIG. 9 is a schematic illustration of a membrane coating process used to form membrane sheets in accordance with the invention where each membrane sheet has first and second portions.

Figure 10:
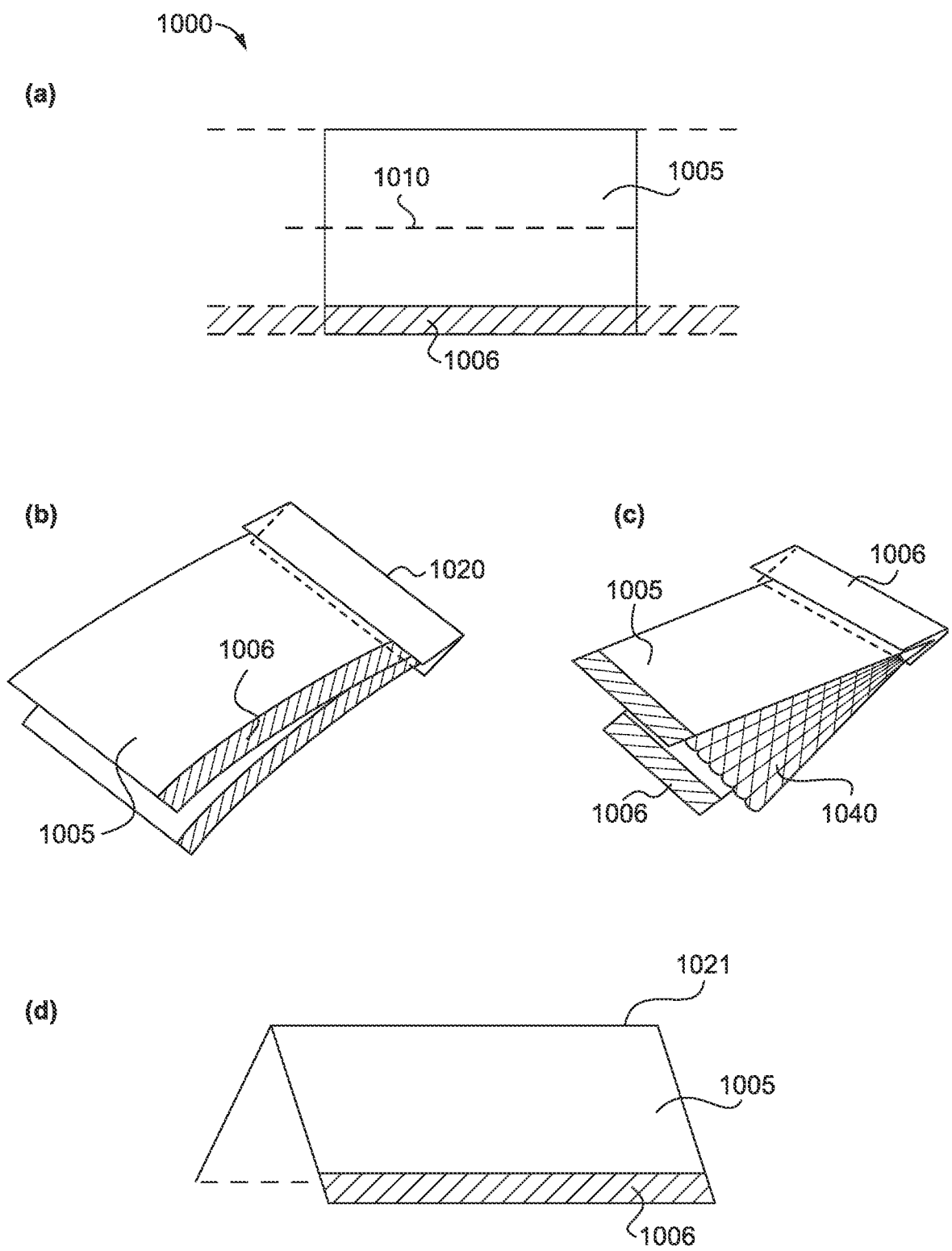

FIG. 10 is a schematic diagram of part of a process used to form the crossflow membrane module of the present invention.

Figure 11:
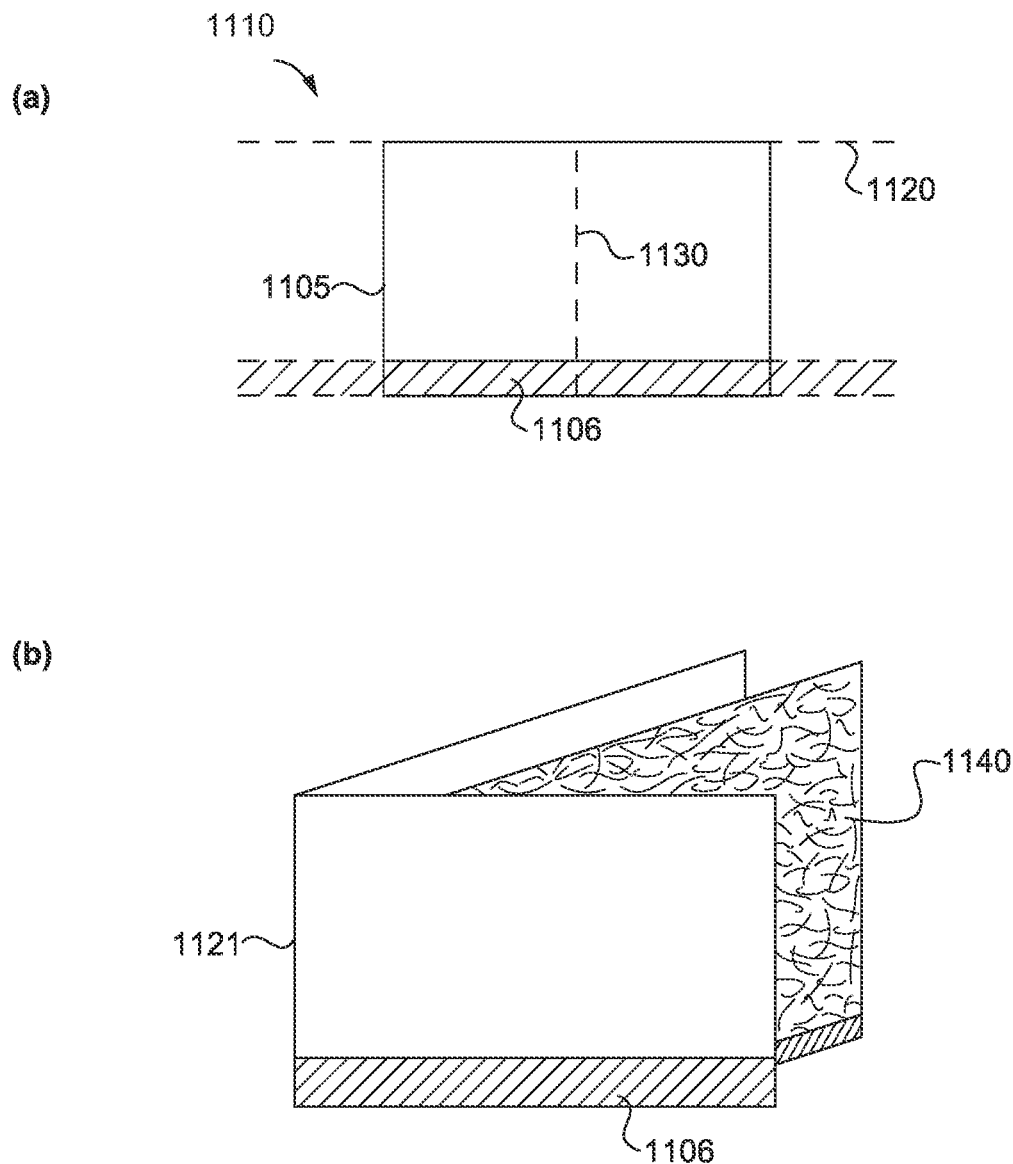

FIG. 11 is a schematic diagram of part of a process used to form the crossflow membrane module of the present invention.

Figure 12:
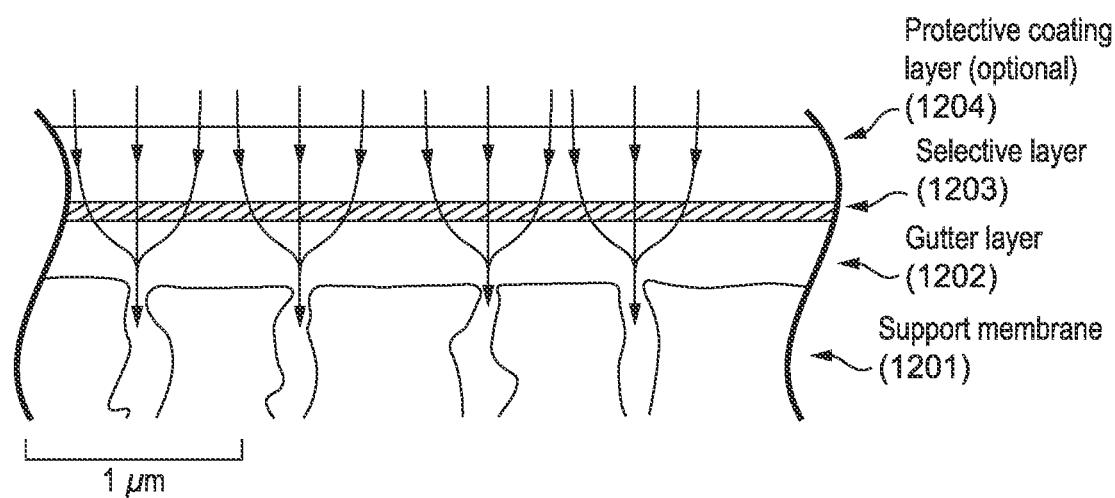

FIG. 12 is an illustration of a multilayer composite membrane useful for understanding the invention.

FIGS. 13(a) and (b) are schematic diagrams of a membrane sheet in accordance with a first embodiment of the present invention.

FIGS. 14(a) and (b) are schematic diagrams of a membrane sheet in accordance with a second embodiment of the present invention.

FIG. 15(a) is a schematic diagram of a perspective view of a crossflow module of the present invention where the module configured as a plate-and-frame module.

FIG. 15(b) is a sectional view of the plate-and-frame module depicted in FIG. 15(a).

FIGS. 16(a) and (b) are schematic diagram of a perspective view of a cross flow module of the present invention where the module configured as a plate-and-frame module.

FIG. 16(a)(i) and (b)(i) are sectional views of the plate-and-frame module depicted in FIGS. 16(a) and (b), respectively.

FIGS. 17(a) and (b) are exploded views of a crossflow module of the present invention where the module is configured as a spiral-wound module and comprises membrane sheets and a central tube.

Figure 17:
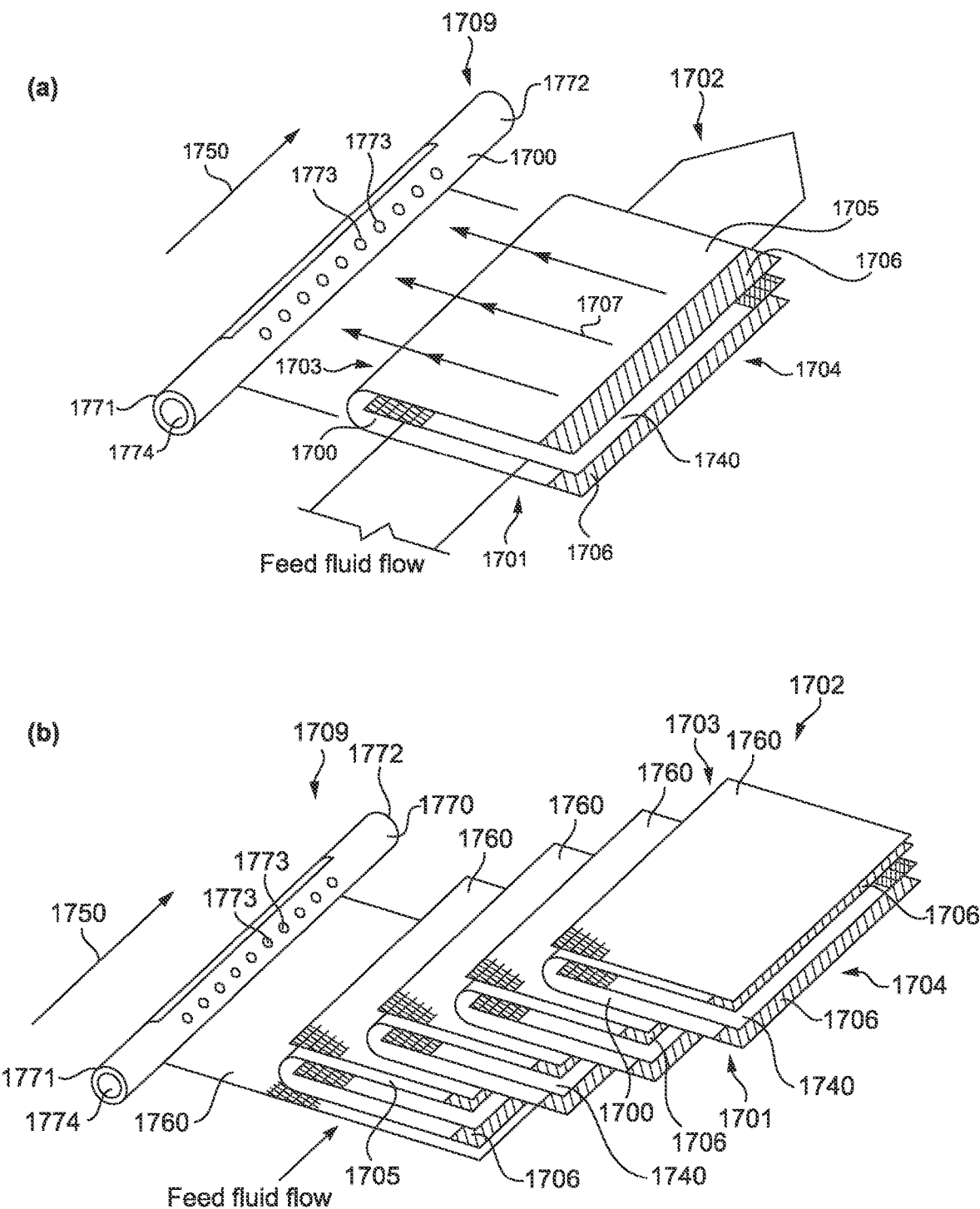
Figure 17C:
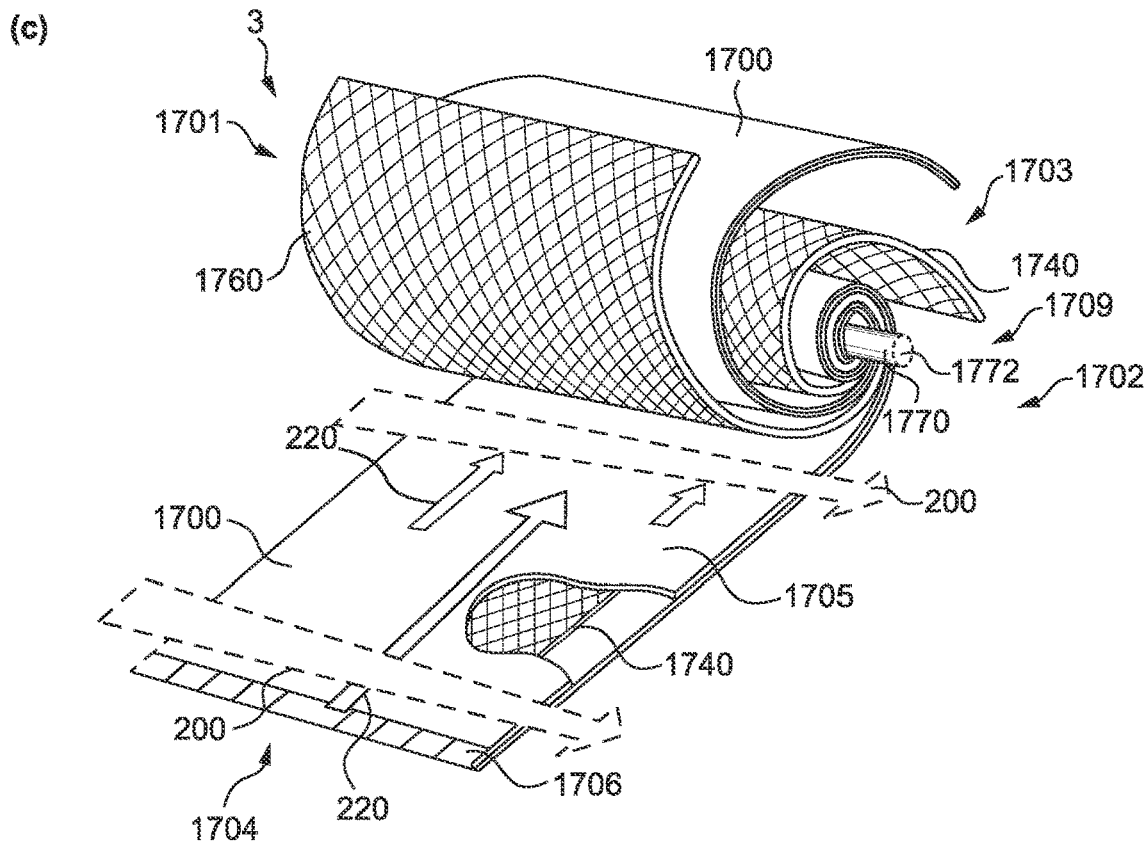

FIG. 17(c) is a perspective view of the module of FIGS. 17(a) and (b) where the membrane sheets are partially wound around the central tube.

Figure 17D:
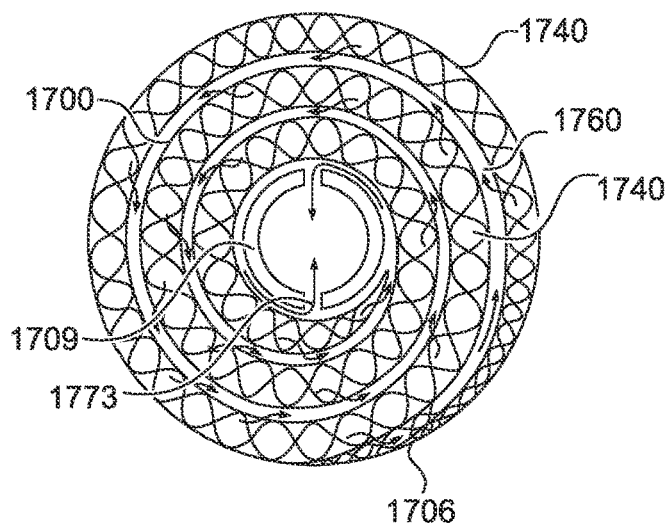

FIG. 17(d) is a sectional view of the module of FIGS. 17(a), (b) and (c) from the terminal end of the central tube where the membrane sheets are entirely wound around the central tube.

FIG. 18(b) is a graph of $CO_2$ concentration in the permeate fluid vs membrane area of the section portion as a fraction of the total area of the membrane sheet where the membrane sheet is configured as shown in FIG. 18(a).

DETAILED DESCRIPTION OF THE INVENTION

Before the present invention, modules employing a sweep fluid have been applied to counterflow hollow fiber modules, with a form similar to that in FIGS. 3, 4, 5 and 7 in which a sweep fluid is introduced at the residue end of the module to enhance the performance of a countercurrent module. The module configuration of our invention uses an internally generated sweep fluid into a crossflow module. Sweep designs described in the membrane or patent literature have been limited to counterflow designs. The inventors have found that sweep configurations applied to crossflow modules unexpectedly produce a significant improvement in separation performance and crossflow modules equipped with internal sweep are particularly preferred. In the present invention, the sweep fluid flow is controlled by permeating a part of the feed fluid into the permeate fluid. Accordingly, the sweep fluid is generated internally. Using internally generated sweep in a crossflow membrane module having membrane sheets leads to surprising technical effects. The present invention is particularly suited to membrane modules formed using flat sheet membranes, particularly spiral-wound or plate-and-frame modules.

Membrane Sheet Formation

This invention is focused on the use of modules comprising flat sheet membranes. The flat sheet membranes may be formed into spiral wound or plate-and-frame modules. The membrane used to make the modules is usually made as continuous rolls typically 40 to 60 inches wide and several hundred meters long. The selective layer used to perform the separation is usually thin and delicate and so almost all membranes are made by a coating or casting/precipitation process in which the membrane is formed onto a roll of strong non-woven support paper that provides mechanical strength. A range of coating and casting procedures are used to prepare these membranes as described, for example, in "Membrane Technology and Applications", Richard Baker, John Wiley ed., (2012). This invention is not limited to any particular type of membrane, and those skilled in the art will be able to modify known membrane production techniques to make the membrane sheets needed for the present invention.

By way of example, FIG. 8 shows how a conventional coating process can be adapted to make membrane sheets having first and second portions used in the present invention. In FIG. 8, a role of support membrane is taken from feed roll 801 and pulled underneath a coating container 806 and over coating roll 809. The coating container 806 used to dispense the coating solution has first sections 905 positioned either side of a second section 804 where the sections 804, 805 are separated from each other by separators (dams) 810 and 811. The separators 810, 811 are thin. The first sections 805 contain a first coating solution and the second section 804 contains a second coating solution. Two coated areas are produced on the paper film as it passes underneath the coating container. First Area 807 is coated with coating solution 805 and forms the first portion of the membrane sheets. Second area 808 is coated with coating solution 804 and forms the second portion. The second coating solution has a higher permeance for the major component than the first coating solution. Consequently, the second portion has a higher permeance than the first portion, in particular for the major component. The first portion has a higher selectivity than the second portion.

The coating of the first and second areas 807, 808 may be performed on only the first major surface of each membrane sheet. Alternatively, the coating of the first and second areas 807, 808 may be performed on both the first major surface and the second major surface of each membrane sheet.

By moving the position of the separators/dams, 810, 811, the position and size of the strip of the second portion (the high permeance membrane) can be varied from one side of the membrane to the other. The flux of permeate through this portion/area of membrane is easily controlled by adjusting the composition of the coating solution and the area of the strip.

In the example apparatus shown in FIG. 8, both portions of the membrane were formed in the same coating operation. However, it may be easier to first form one portion of the membrane and then, in a second operation, form the second portion. Both options are encompassed within the present invention.

A second type of membrane coating apparatus representative of what may be used to make membrane sheets of the present invention is shown in FIG. 9. This type of equipment is used to make membrane sheets that are multilayer composite membrane sheets, as shown in FIG. 12. Composite membrane sheets are multilayer structures consisting of a microporous support 1201 that provides the mechanical strength and several coating layers that make up the selective membrane. The first layer is the gutter layer 1202 which is made from a very high permeance but non selective material. The gutter layer 1202 serves to conduct permeate to the pores of the support membrane, and it also provides a smooth surface on which the selective layer 1203 can be coated. The selective layer 1203 is then coated with a final protective layer 1204 of high permeance polymer that serves to protect the selective layer from damage during module preparation or use.

The apparatus that may be used to make such membrane sheets is shown in FIG. 9. A roll of support paper 901 is first passed through the gutter layer applicator 906 after which the membrane is dried in oven 907. The membrane then passes to the selective layer applicator where the selective layer is applied, after which the membrane is again dried in oven 903. Finally, the membrane is coated with a protective layer with applicator 904 before being dried in oven 905.

One or more of the coating containers used in this apparatus can be modified as shown in FIG. 10(b) to produce regions of the membrane with the different permeation properties needed. Two Teflon plates 914 and 915 are shaped to snuggly fit around the steel rolling bar and serve to divide the coating container into two sections, allowing different membranes to be coated onto the moving support.

The second portions (high permeance areas) of the membrane sheets produced by the process illustrated in FIGS. 8 and 9 are formed as continuous strips along the membrane sheets. Depending on the configuration of the membrane module being constructed, sections of the strips may be occluded by covering with tape or other means if desired.

Construction of the Membrane Module

In the description of FIGS. 8 and 9, the methods of making membrane rolls with the second portion (i.e. high permeance area) formed as a strip of the membrane along one edge of the role were described. Such a membrane roll could be cut and fabricated into membrane sheets that may be assembled together in several ways as FIG. 10 shows.

In FIG. 10(a), sheets of membrane are cut from the role consisting of high selectivity membrane having a strip of high permeance membrane (i.e. the second portion) 1006 along one edge. The remainder of the membrane sheet that is not the second portion 1006 (i.e. the area of high selectivity) forms the first portion 1005. FIGS. 10(b) and 10(c) show how two sheets of membrane may be sealed together along a side edge. In FIG. 10b, this is done by using an adhesive tape 1020, but an epoxy or urethane glue could be used in addition or instead. In FIG. 10(b), the second portion (high permeance strip) 1006 extends transverse to the edge where the membrane sheets are joined. In FIG. 10(c), the membrane sheets are joined at the opposite edge from second portion (the high permeance strip). Exemplary methods of laminating membrane sheets together for membrane modules are described in U.S. Pat. No. 8,661,648. Finally, it is also possible to cut the membrane sheet and fold it along the longitudinal axis 1010 as shown in FIG. 10d. The second portion (the region of high permeance) 1006 is spaced apart from the fold 1021 along a direction transverse to the longitudinal axis 1010. In particular, the second portion 1006 is opposite to the fold 1021. A feed spacer 1040 is provided within the space defined by the fold or within the space between the sealed membrane sheets so as to provide a fluid path along the major surfaces of the membrane sheets 1000. The membrane may be folded around the feed spacer 1040 such that a membrane sheet 1000 is provided on either side of the spacer feed 1040.

FIG. 11 shows that a number of membrane sheets 1100 could be assembled together by cutting rectangular sheets of membrane along their longitudinal axis 1120 and then folding the membrane sheets along the transverse direction 1130. The fold 1121 is then preferably perpendicular to the second portion (the high permeance area of the membrane) 1106. A feed spacer 1140 is provided within the spaced defined by the fold so as to provide a fluid path along the major surfaces of the membrane sheets 1100.

When the membrane sheets 1000, 1100 folded around the feed spacer 1040, 1140, this may be considered to form a pair of membrane sheets where the first major surface of each membrane sheet is adjacent to the feed spacer. In other words, the first major surface of each membrane sheet is facing each other and spaced apart by the feed spacer 1240, 1340 therebetween. The pair of membrane sheets may be considered to be a membrane envelope.

Figure 16:
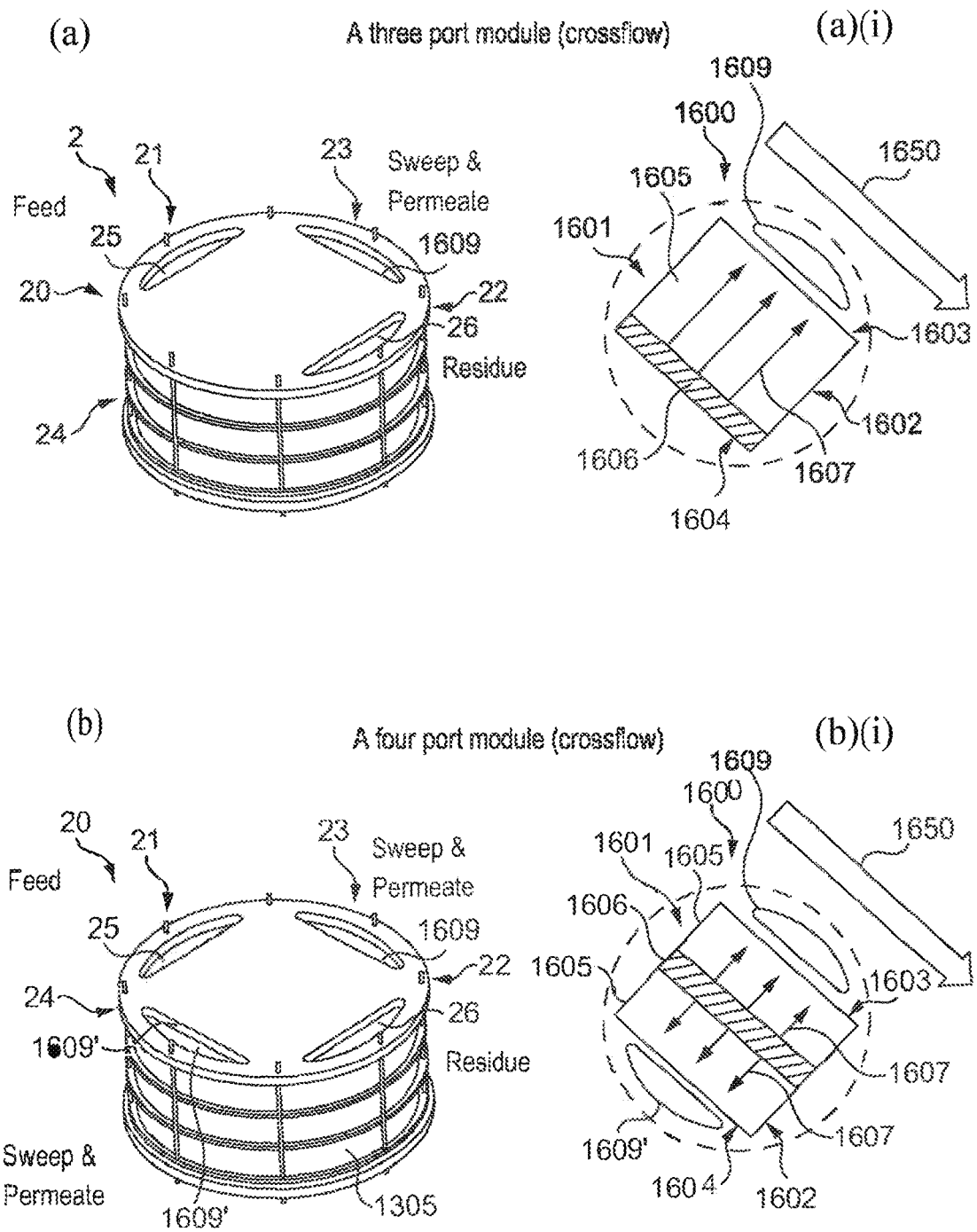

The membrane sheets 1000, 1100 are assembled in modules, typically spiral-wound or plate-and-frame modules as shown in FIGS. 16 and 17. These modules are widely used in gas separation and pervaporation applications. Spiral wound modules are typically contained in a cylindrical pressure vessel. In known modules, the entire membrane sheet 1000, 1100 that encloses the fluid path for permeate fluid would be made of the same selective membrane. In our invention, a portion (the second portion 1006, 1106) of the membrane sheet 1000, 1100 has a much higher average permeance than the rest of the membrane sheet. The second portion 1006, 1106 will also have a lower selectivity. Because of its higher permeance and lower selectivity, a sweep effect is generated in the flow path for the permeate fluid by the fluid permeating the second portion 1006, 1106 of the membrane sheet.

Configurations of the Membrane Module

Figure 13:
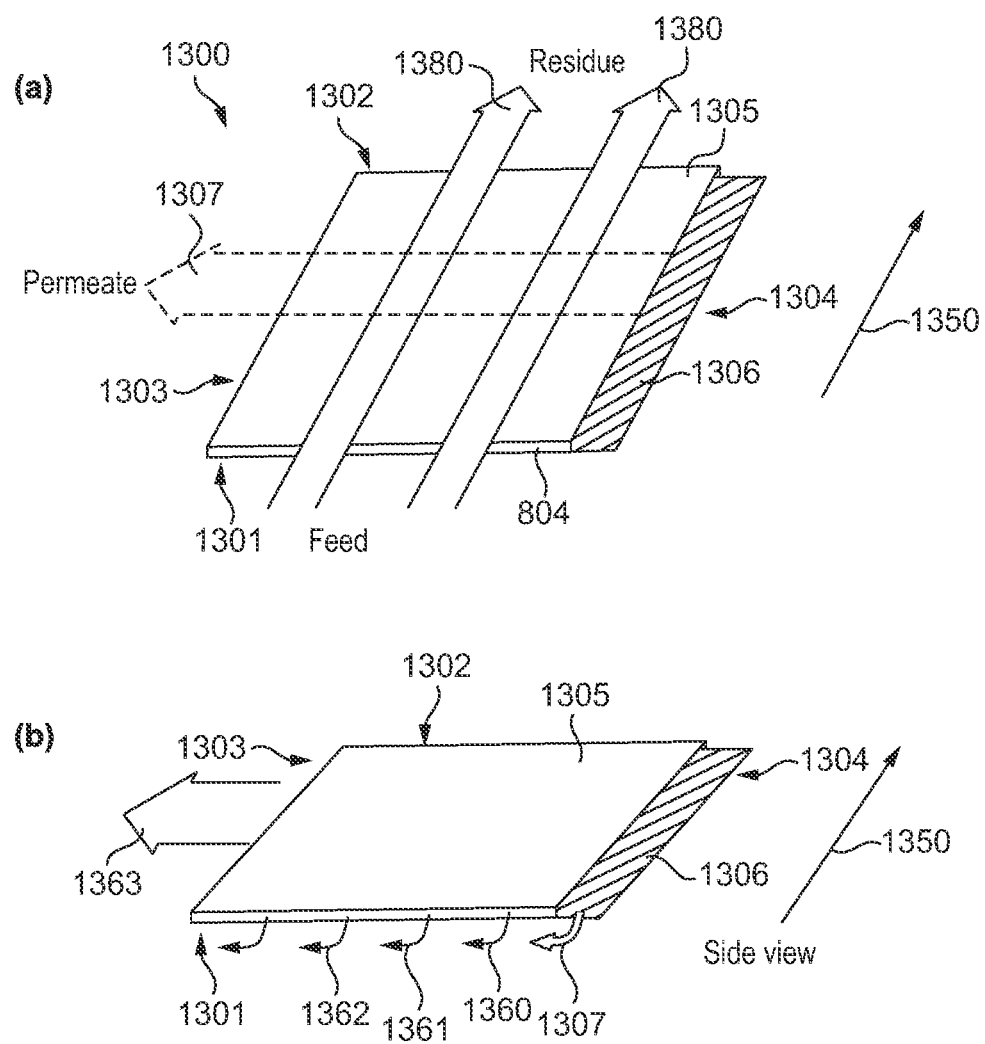
Figure 14:
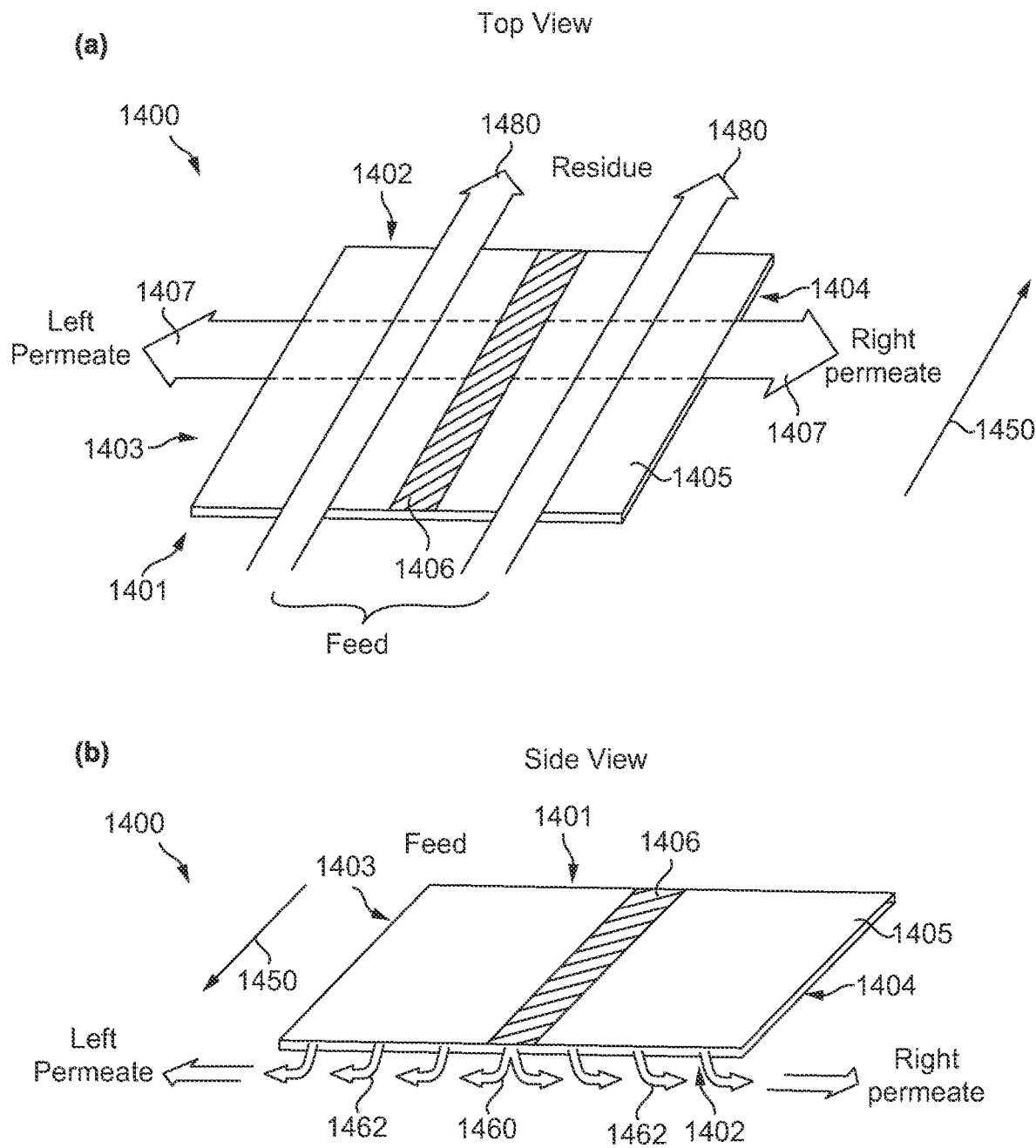

A configuration for the membrane sheet 1300 in accordance with a first embodiment is shown in FIGS. 13(a) and (b) together with the flow path for feed and residue fluid and the flow path for the permeate. A configuration for the membrane sheet 1400 in accordance with a second embodiment is shown in FIGS. 14(a) and (b) together with the flow path for feed and residue fluid and the flow path for the permeate. A membrane sheet having the configuration shown in FIG. 13 can be incorporated into crossflow spiral wound or plate-and-frame modules. A membrane sheet having the configuration shown in FIG. 14 can be incorporated into a plate-and-frame module. For each membrane sheet 1300, 1400, The second end 1302, 1402 of the membrane sheet 1300, 1400 is spaced apart from the first end 1301, 1401 along the first direction 1350, 1450. The second side 1304, 1404 of the membrane sheet 1300, 1400 is spaced apart from the first side 1303, 1403 along the second direction, which is transverse to the first direction 1350, 1450. The flow paths for the second part of the permeate fluid are indicated by the arrows labelled with reference numeral 1307, 1407. The flow path for the feed and residue flow is indicated by the arrows labelled with reference numeral 1380, 1480. In the exemplary configuration shown in FIGS. 13 and 14, the feed fluid flowing along the first major surface of the membrane sheet 1300, 1400 follows a generally straight path along the first direction 1350, 1450, which is from bottom to top in the figures. The permeate flow in the configurations in FIGS. 13 and 14 is in the direction transverse (more specifically perpendicular) to the flow of feed fluid and residue fluid (i.e. from right to left and/or from left to right in the Figures). The permeate fluid flows along the opposite major surface from the feed fluid and residue fluid. In FIGS. 13 and 14, the feed and residue fluid flow along the upper major surface and the permeate flows along the lower residue surface.

The second portion 1306, 1406 has a significantly higher permeance for the major component of the feed fluid, and preferably a lower selectivity, than the rest of the membrane (the first portion 1305, 1405). The side views in FIGS. 13(*b*) and 14(*b*) shows the flow pattern for the permeate fluid because of the presence of the high-permeance portion (the second portion 1306, 1406).

In the configuration shown in FIG. 13(*a*), the second portion 1306 (the high permeance region of the membrane sheet) extends along the outer edge of the second side 1304 and is formed as a strip. In particular, the second portion 1306 extends along the entire outer edge formed by the second side 1304 such that its axial range in the first direction 1350 is the same as the length of the membrane sheet 1300 in the first direction 1350.

The second part of the permeate fluid, which is the part of the permeate fluid generated by the feed fluid penetrating through the second portion 1306, flows in accordance with arrow 1307 towards the first side. The second part of the permeate fluid 1307 has a lower concentration of the permeating minor component than an adjacent part of the permeate fluid generated by separation across the first portion 1305 of the membrane sheet 1300. The second part of the permeate fluid 1307 mixes with the adjacent part of the permeate fluid labelled with arrow 1360 leading to dilution of the concentration of the minor component in the permeate fluid labelled with arrow 1360 and consequently increasing the driving force for permeation. The mixed fluid produced has the same diluting effect on the part of the permeate fluid 1361 and 1362 closer to the first side and so also leads to an increase in the driving force for permeation in this region of the membrane. The overall result of this increase in driving force is that the total permeate 1363 is considerably larger than it would have been without the sweep effect. In the examples that follow, we will show that the impact of this sweep effect can increase fluid permeation through the membrane sheet 1300 by as much as a factor of 2 or more. We will also show that, very surprisingly, the sweep effect can increase the permeate purity.

In the second embodiment shown in FIG. 14, the second portion is formed as a strip extending along the first direction and positioned between the first and second sides. The second portion has a length extending between the first end and the second end along the first direction. The second portion in this arrangement is optionally equidistant between the first side and the second side.

The second part of the permeate fluid, which is the part of the permeate fluid generated by the feed fluid penetrating through the second portion 1406, flows in accordance with arrows 1407 towards the first and second sides 1403, 1404 (i.e. a portion of the second part of the permeate fluid 1407 flows towards the first side 1403 and a second portion of the second part of the permeate fluid 1407 flows towards the second side 1404). Typically approximately half of the permeate fluid flows to the left and the other half to the right. The second part of the permeate fluid 1407 has a lower concentration of the permeating minor component than an adjacent part of the permeate fluid generated by separation across the first portion 1405 of the membrane sheet 1400. The second part of the permeate fluid 1407 mixes with the adjacent part of the permeate fluid labelled with arrows 1462 leading to dilution of the concentration of the minor component in the permeate fluid labelled with arrow 1462 and consequently increasing the driving force for permeation. The mixed fluid produced has the same diluting effect on the part of the permeate fluid 1462 further from the second portion 1406 and so also leads to an increase in the driving force for permeation in this region of the membrane. As discussed above in respect of FIG. 13, the overall result of this increase in driving force is that the total permeate is considerably larger than it would have been without the sweep effect.

The conduit (not shown in the Figure) would be adjacent to and in fluid communication with the first side 1303, 1403 of the membrane sheet. The conduit 1409 comprises opening(s)/aperture(s) configured to receive the permeate fluid. The axial range of opening(s)/aperture(s) in the conduit is the same as the axial range of the second portion 1306, 1406 in the first direction 1350, 1450. The conduit would be spaced apart/opposite from the second portion 1306 along the second direction.

Figure 15:
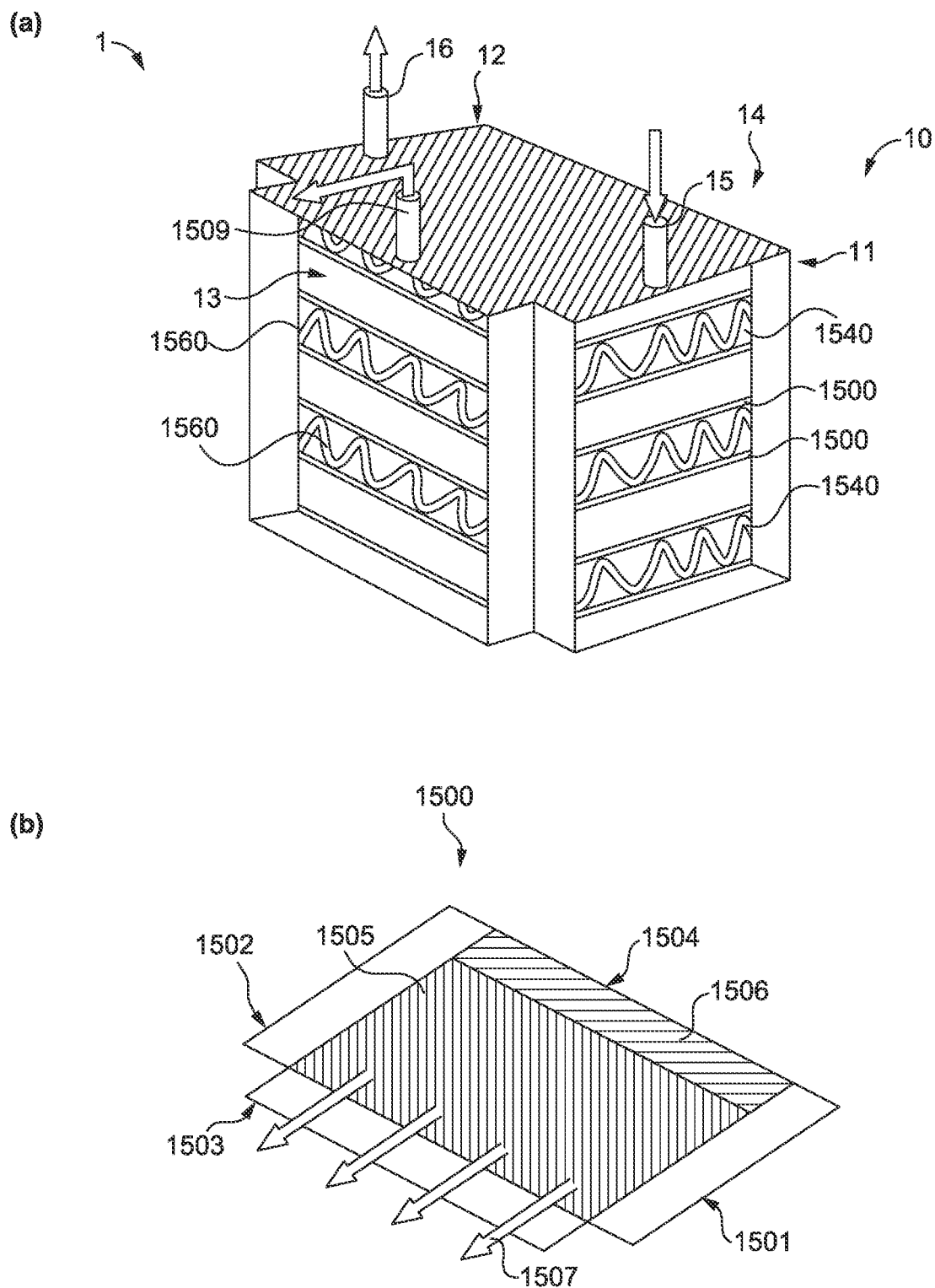

FIG. 15(*a*) is a perspective view of a crossflow membrane module 1 of the present invention formed as a plate-and-frame module. FIG. 15(*b*) is a plan view of a membrane sheet 1500 of the module 1.

The module 1 comprises a housing 10. The housing 10 comprises a first end 11 spaced apart from a second end 12 along the first direction. The housing 10 comprises a first side 13 spaced apart from a second side 14 along a second direction which is transverse to the first direction 1550. The module 1 comprises a plurality of membrane sheets 1500, feed spacers 1540 and permeate spacers 1560 arranged in a stacked configuration. Each space between adjacent membrane sheets 1500 is defined by either a feed spacer 1540 or a permeate spacer 1560. The membrane sheets 1500 are arranged in alternating orientations such that the first major surface of each membrane sheet 1500 is in contact with a feed spacer 1540 and the second major surface of each membrane sheet 1500 is in contact with a permeate spacer 1560. The feed spacers 1540 and the permeate spacers 1560 define paths for the flow of fluid between each membrane sheet 1500. The membrane sheets 1500 may be any of those discussed in the present application, in particular of the configuration shown in FIGS. 14(*b*) to 14(*e*). The membrane sheets 1500 may be folded around the feed spacers 1540 to form pairs of membrane sheets wherein for each pair of membrane sheets, the first major surfaces are separated by the feed spacer 1540 therebetween. The first major surfaces either side of a feed spacer 1540 may be sealed along their second side 1504 so as to define a fluid path through the feed spacer 1540 along the first major surfaces.

A permeate spacer 1560 is provided adjacent to the second major surface of each membrane sheet 1500. The permeate spacers 1560 separate each pair of membrane sheets 1500 folded around the feed spacer 1540 from the subsequent pair of membrane sheets 1500. The second major surfaces of each membrane sheet 1500 (the permeate side) may be sealed along their second side 1504, first end 1501 and second end 1502 so as to define a fluid path through the permeate spacer 1560 to the conduit 1509 along the second major surfaces. The sealing may be achieved with, for example, tape, sealing fluid, heat sealing, o-rings or sealing layers. The first side 1503 of the second major surface is open (i.e. unsealed) to fluidly connect with the conduit 1509.

In the arrangement shown in FIG. 15(*a*), the feed spacers 1540 and the permeate spacers 1560 are corrugated. The corrugated feed spacers 1540 are arranged so that the longitudinal direction of the ridges extends parallel to the first direction. The ridges define flow paths thereby directing flow along the first direction. The corrugated permeate spacers 1560 are arranged so that the longitudinal direction of the ridges extends parallel to the second direction. The ridges define flow paths thereby directing flow along the second direction.

The arrangement where membrane sheets 1500 are folded around a feed spacer 1540 may be considered to be a membrane envelope. A series of membrane envelopes may be created and then layered one on top of the other, interleaved with permeate spacers 1560. As many as 50 to 100 envelopes maybe contained within the housing 10.

An inlet 15 is provided at the first end 11 of the housing 10 and an outlet 16 is provided at the second end 12 of the housing 10. The inlet 15 is in fluid communication with the first end 1501 of the first major surface (the feed side) of each of the membrane sheets 1500. The outlet 16 is in fluid communication with the second end 1602 of the first major surface (the feed side) of each of the membrane sheets 1600. Ducts may be employed to achieve fluid communication between the inlet 15 and the outlet 16 with the first major surfaces of each of the membrane sheets 1500. The ducts are not shown in this drawing to allow the interior configuration of the fluid paths defined by the feed spacers 1540 and permeate spacers 1560 to be seen.

The entire arrangement has the general form of a large book. In the embodiment shown in FIG. 15(*a*), the conduit 1509, the inlet 15 and the outlet 16 are positioned on an outer surface of the housing with the inlet 15 proximal to the first end 11, the outlet proximal to the second end 12 and the conduit proximal to the first side. The conduit being equidistantly spaced between the first end 11 and the second end 12. This is typically considered to be a three port module.

In use, feed fluid passes along one major surface of the membrane sheet 1500 from the inlet 15 towards the outlet 16 via the fluid path defined by the feed spacer 1540 (i.e. through the feed spacer 1540) between adjacent membrane sheets 1500 along the first direction 1550. A portion of the feed fluid permeates through the respective membrane sheet 1500 and is referred to as the permeate fluid. The permeate fluid moves along the opposite major surface from the feed fluid (i.e. the second major surface). A first part of the permeate fluid is generated by feed fluid passing through the first portion 1505 of the membrane sheet 1500 and a second part of the permeate fluid is generated by feed fluid passing through the second portion 1506 of the membrane sheet 1500. The second portion 1506 has a greater permeance for the major component than the first portion 1505 and so the second part of the permeate fluid has a higher concentration of the major component. The second part moves towards the first end 11. The second part therefore dilutes the concentration of the minor component within the first part of the permeate fluid (i.e. a sweep effect) thereby increasing the driving force for the separation across the membrane sheet 1500. The conduit 1509 is adjacent to the first side 1503 of the membrane. The first side 1503 of the second major surface of each membrane sheet 1500 is an open edge of the membrane sheet 1500 that is adjacent to the conduit 1509. In other words, the first side 1503 of the second major surface of each membrane sheet is not sealed. The first and second ends of the second major surface of each membrane sheet may be sealed, for example with tape or sealing fluid. The conduit 1509 receives the permeate fluid via an aperture/opening and outputs the permeate fluid from the module 1.

As shown in FIG. 15(*b*), the membrane sheet 1500 may be configured such that the second portion 1506 extends along the outer edge formed by the second side. The second portion 1506 is spaced apart from the first side along the second direction. The second portion 1506 extends over the entire length of the second side. The second portion 1506 is formed as a strip having its length extending along the first direction.

FIGS. 16(*a*) and 16(*b*) are simplified perspective views of plate-and-frame modules 2 formed according to this invention. FIGS. 16(*a*)(*i*) and 16(*b*)(*i*) are plan views of a section of the modules of FIGS. 16(*a*) and (*b*) to illustrate the configuration of one of the membrane sheets 1600 therein. In the modules shown in FIGS. 16(*a*) and (*b*) multiple membrane sheets 1600 are stacked on top of each other with feed spacers 1640 and permeate spacers 1660 therebetween. In particular, the feed spacers 1640 may be placed within a fold of the membrane such that membrane sheets 1600 are on either side of the fold, as discussed in respect of FIGS. 12 and 13. As many as 50 to 100 pairs of membrane sheets 1600 having a feed spacer 1640 therebetween maybe contained with the housing 20. The feed spacers 1640 and permeate spacers 1660 are configured as discussed in respect of FIG. 15.

The housing 20 is formed as a cylinder in FIGS. 16(*a*) and 16(*b*). The housing has its second end 22 spaced apart from its first end 21 along the first direction 1650 and its second side 24 spaced apart from its first side 23 along the second direction, which is transverse to the first direction. An inlet 25 is provided at the first end 21 of the housing 20 and an outlet 26 is provided at the second end 22 of the housing 20. The inlet 25 is in fluid communication with the first end 1601 of each of the membrane sheets 1600. The outlet 26 is in fluid communication with the second end 1602 of each of the membrane sheets 1500.

In the embodiment shown in FIG. 16(*a*), as shown in FIG. 16(*a*)(*i*), the membrane sheets therein are configured as shown in FIG. 13 which has been discussed above. As discussed above, the membrane sheets 1600 each have a second portion 1606 extending along the outer edge formed by the second side 1604 of the membrane sheet 1600. A conduit 1609 is provided at the first side 23 of the housing 20. The conduit 1609 is adjacent to the first side 1603 of each of the membrane sheet 600. The conduit 1609 has an opening/aperture for receipt of the permeate fluid.

In the embodiment shown in FIG. 16(*a*), the first major surfaces of each of the membrane sheets 1600 would be sealed along their first and second sides 1603, 1604 to define a fluid path from the inlet 25 to the outlet 26 along the first major surface through the feed spacer (not shown). The second major surfaces of each of the membrane sheets 1600 would be sealed along their first end 1601, second end 1602 and second side 1604 to define a fluid path along the second major surface to the conduit 1609 through the permeate spacer (not shown). The first side 1603 of the second major surface is open (i.e. unsealed) to fluidly connect with the conduit 1509.

In the embodiment shown in FIG. 16(*b*) as shown in FIG. 16(*a*)(*i*), the membrane sheets therein are configured as shown in FIG. 13 which has been discussed above. As discussed above, the membrane sheets 1600 each have a second portion 1606 spaced apart from both the first and second sides 1603, 1604. The second portion 1606 is formed as a strip extending along the first direction between the first and second ends 1601, 1602 of the membrane sheet. The second portion 1606 is approximately equidistantly spaced between the first and second sides 1603, 1604.

In this embodiment, there are two conduits. The first conduit 1609 is provided on the first side 1603 of the housing 20 and the second conduit 1609' is provided on the second side of the housing 24 such that the first and second conduits 1609, 1609' are spaced apart along the second direction. The first conduit 1609 is adjacent to and in fluid communication with the first side 1603 of the membrane sheet 1600 and the second conduit 1609' is adjacent to and in fluid communication with the second side 1604 of the membrane sheet 1600. Both the first and second conduits 1609, 1609' have an opening/aperture for receipt of permeate fluid.

In the embodiment shown in FIG. 16(b), the first major surfaces of each of the membrane sheets 1600 would be sealed along their first and second sides 1603, 1604 to define a fluid path from the inlet 25 to the outlet 26 along the first major surface through the feed spacer (not shown). The second major surfaces of each of the membrane sheets 1600 would be sealed along their first end 1601 and second end 1602 to define a fluid path along the second major surface to the first and second conduits 1609, 1609' through the permeate spacer (not shown). The first side 1603 and the second side 1604 of the second major surface are open (i.e. unsealed) to fluidly connect with the first conduit 1509 and second conduit 1609', respectively.

For the embodiment shown in FIG. 16(b), in use, feed fluid passes along the first major surface of the membrane sheet 1600 from the inlet 25 towards the outlet 26 via the fluid path defined by the feed spacer (not shown) between adjacent membrane sheets 1600 along the first direction 1650. The first and second sides 1603, 1604 of the first major surface of each membrane sheet 1600 are sealed to fluidly seal the fluid path for the feed fluid and residue fluid along the first major surface. A portion of the feed fluid permeates through the respective membrane sheet 1600 and is referred to as the permeate fluid. The permeate fluid moves along the second major surface of the membrane sheet 1600 (i.e. the major surface of the membrane sheet 1600 opposite from the major surface along which the feed and residue fluid flows). A first part of the permeate fluid is generated by feed fluid passing through the first portion 1605 of the membrane sheet and a second part of the permeate fluid is generated by feed fluid passing through the second portion 1606 of the membrane sheet 1600. The second portion 1606 has a greater permeance for the major component than the first portion 1605 and so the second part of the permeate fluid has a higher concentration of the major component. Approximately half of the second part of the permeate fluid moves towards the first side 23 and the other half of the second part of the permeate flow moves towards the second side 24 as indicated by the arrows 1607. The second part of the permeate fluid therefore dilutes the concentration of the minor component within the first part of the permeate fluid (i.e. a sweep effect) thereby increasing the driving force for the separation across the membrane sheet 1600. As discussed above, the first and second sides 1603, 1604 of the second major surface of each membrane sheet 1600 are open such that the first and second sides 1603, 1604 of the second major surface of membrane sheet 1600 are in fluid communication with the conduit 1609. The first and second ends 1601, 1602 of the second major surface of each membrane sheet 1600 may be sealed with tape or adhesive to seal to the fluid path defined by the permeate spacer (not shown) for the permeate fluid. The conduits 1609, 1609' receive the permeate fluid and output the permeate fluid from the module 2.

FIGS. 17(a) to (d) depict a crossflow membrane module of the present invention formed as a spiral-wound module. FIGS. 17(a) and (b) are exploded views of the module 3. Such modules are very useful for gas separation and pervaporation applications. In this arrangement, the membrane sheets 1700, although not shown due to the exploded view, would be wound around the conduit 1709 to define a spiral perpendicular to the first direction. However, in this exploded view, the membrane sheets 1700 are shown in an unwound state. There are spaces for fluid flow between each membrane sheet 1700 due to the presence of feed spacers 1740 and permeate spacers 1760 therebetween. The membrane sheets 1700 may be folded over the feed spacer 1740 to form a pair of membrane sheets where the first major surface of each membrane sheet is adjacent to the feed spacer 1740. In other words, the first major surface of each membrane sheet is facing each other and spaced apart by the feed spacer 1740 therebetween. The pair of membrane sheets may be separated from adjacent pairs of membrane sheets by permeate spacers 1760 where each permeate spacer 1760 is adjacent to a second major surface of the membrane sheets 1700. The first major surface of each membrane sheet may be sealed along its first side 1703 and second side 1704 to define the fluid path for the feed fluid and residue fluid along the first major surface. In this arrangement, the seal along the first side 1703 is provided by the fold between the first side 1703 of each of the pair of membrane sheets 1700. The second major surface of each membrane sheet 1700 may be sealed along its first end 1701, second end 1702 and second side 1704 to define the fluid path for permeate fluid along the second major surface. FIG. 17(b) differs from 17(a) as more membrane sheets 1700, feed spacers 1740 and permeate spacers 1760 are present. The feed spacer 1740 is configured to direct flow of fluid in the first direction. The permeate spacer 1760 is configured to direct flow of fluid in the second direction. The direction of the flow of fluid by the spacers is achieved by forming the spacers of a material having different permeability in different directions. This difference in permeability is achieved by the weave of the fibres in the material used to form the spacer. The feed spacer is orientated such that the high permeance direction (i.e. low flow resistance) is parallel to the first direction. The permeate spacer is orientated such that the high permeance area (i.e. low flow resistance) is parallel to the second direction.

The conduit 1709 is a central tube extending along the first direction 1750. The central tube 1709 comprises a cylindrical surface 1770 and first and second terminal ends 1771, 1772 defining a lumen therebetween. The central tube comprises openings 1773 in the cylindrical surface. The openings are configured to receive the permeate fluid separated from the feed fluid. The openings are in fluid communication with the first side 1703 of the membrane sheet 1700. The openings 1773 are aligned with the second portion 1706 of the membrane sheet.

The conduit 1709 further comprises an outlet 1774 configured to output the permeate fluid received by the one or more opening(s), wherein the outlet is in the first or second terminal end of the central tube 1771, 1772. The outlet is optionally shown at the first terminal end of the central tube 1771 in FIG. 17.

The openings/apertures 1773 in the conduit 1709 are spaced apart along the first direction 1750. The axial range of the openings/apertures 1773 in the conduit 1709 overlap the axial range of the second portion 1706 of the membrane sheet 1700. In particular, the axial range of the openings/apertures 1773 in the conduit is the same as the axial range of the second portion 1706 of the membrane sheet 1700. The axial range of the openings/apertures 1773 and the axial range of the second portion 1706 may be the same as the length of the membrane sheet 1700 in the first direction 1750. Typically, the conduit 1709 has openings over the entire axial range of the conduit 1709, which extends the length of the membrane sheet 1700 in the first direction 1750.

The second portion 1706 is formed as a strip. The second portion 1706 is spaced apart from the first side 1703. The second portion 1706 extends along the entire outer edge formed by the second side 1704 of the membrane sheet. In other words, the second portion 1706 is opposite from the conduit 1709 along the second direction.

FIG. 17 (*c*) shows a partially wound version of the crossflow membrane module 3 of the present invention configured as a spiral-wound module. FIG. 17(*d*) shows a cross-section of a wound version of the crossflow membrane module 3 of the present invention configured as a spiral-wound module. The housing is not shown. The conduit 1709 is a central tube extending along the first direction 1750. The membrane sheets 1700 are wound around the central tube 1709 so as to define a spiral perpendicular to the first direction 1750, such that the first side 1703 of the one or more membrane sheet(s) is closer to the central tube 1709 than the second side 1704.

In use (i.e. with the membrane sheets 1700 wrapped around the conduit/central tube 1709 to form a spiral), feed fluid enters the module 3 at the first end 1701 and passes along the first major surface i.e. within the space defined by the feed spacer 1740 between the membrane sheets 1700 from the first end 1701 to the second end 1702 as indicated by dashed arrows 200. The feed fluid is separated across each membrane sheet 1700 and the portion that passes through the membrane sheet 1700 is the permeate fluid. The permeate fluid moves along the second major surface of each membrane sheet 1700, which it opposite from the first major surface of the membrane sheet 1700 (i.e. within the space defined by the permeate spacer 1760). The direction of movement of the permeate fluid shown by arrow 220 in FIG. 17(*c*). Residue fluid passes along the first major surface of each membrane sheet 1700 and so follows the same path as arrow 200. In other words, the residue fluid passes along the same major surface as the feed fluid and the permeate fluid passes along on the opposite major surface. The flow of the second part of the permeate fluid, as shown by the arrows 220 is from the second portion on the second side 1704 to the openings/apertures 1773 in the conduit 1709 on the first side 1703 and so is in the direction from the second side 1704 to the first side 1703 (i.e. the flow of permeate fluid is transverse to the flow of feed fluid and residue fluid) (i.e. transverse to the first direction 1750). Therefore, the second part of the permeate fluid dilutes the first part of the permeate fluid. This dilution increases the driving force for separation across the membrane sheet 1700. In FIG. 17(*c*) a portion of the membrane sheet has been hidden from view to indicate the feed spacer 1740 below. As shown in this Figure, the feed spacers 1740 and the permeate spacers 1760 have approximately the same length and width as the membrane sheets 1700.

A sectional view of the spiral-wound crossflow module from the first end 1701 is shown in FIG. 17(*d*). As can be seen from this figure, the feed spacers 1740 provide the space defining the fluid path for movement of the feed fluid and residue fluid along the first major surface of the membrane sheets 1700. The permeate spacer 1760 provide the space defining the fluid path for movement of the permeate fluid along the second major surface of the membrane sheets 1700. In other words, the feed fluid and residue fluid flow through the feed spacers 1740 and the permeate fluid flows through the permeate spacers 1760. The arrows indicate the movement of permeate fluid along the membrane sheet and spirally inwards towards and into the central tube/conduit 1709.

FIG. 17(*a*) shows a membrane sheet 1700 wrapped around the feed spacer 1740. The membrane sheet 1700 wrapped around the spacer 1740 may be considered to be a membrane envelope. In industrial spiral wound modules, many membrane envelopes are used as a shown in FIG. 17(*b*). In the production process, the conduit 1709 is rotated to wind the membrane sheets 1700 around the conduit 1709, and as it rotates sealant, such as epoxy glue is applied along the first ends 1701 and second ends 1702 of the second major surfaces of the membrane sheets 1700. Once the membrane sheets 1700 have been wound around the conduit 1709, the sealant is also applied along the second sides 1704 of the first and second major surfaces of the membrane sheets 1700. The sealant forms the seals that separate the flow path for the feed fluid from the flow path for the permeate fluid along the surfaces of the membrane sheet 1700. The sealant may also be applied to the first and second ends of the permeate spacers 1760 and the second sides of the feed and permeate spacers 1740, 1760. As best shown in FIG. 17(*b*), the permeate spacer 1760, which forms the outer layer of the spiral wound module (shown in the bottom layer of the stack in FIG. 17(*b*)) is longer than the other permeate spacers 1760 and feed spacers 1740 in the first direction and is attached to the conduit 1709. As the conduit 1709 is rotated, the membrane sheets 1700, permeate spacers 1740 and 1760 are wound around the conduit 1709. The permeate spacer 1760 that forms the inner layer of the spiral wound module (shown on the top of the stack in FIG. 17(*b*)) is sealed to the permeate spacer 1760 forming the outer layer.

EXAMPLES TO ILLUSTRATE THE INVENTION

A number of examples are given below to illustrate the application of the invention to various processes. These calculations were made by using a differential element computer program.

Example 1. Effect of Permeate Crossflow Sweep Flow on Membrane Performance

Figure 18:
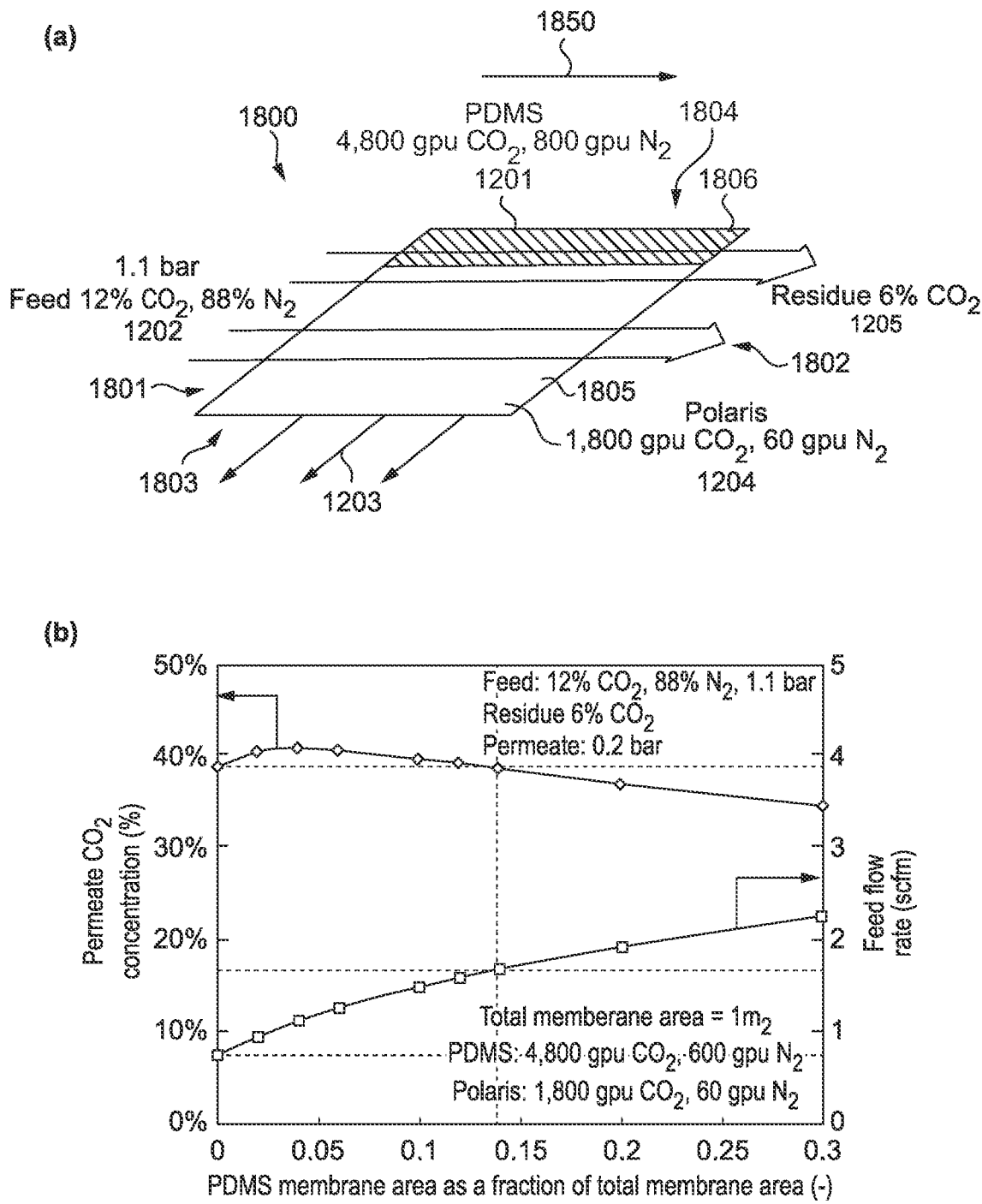

FIG. 18(*b*) shows the calculated performance obtained with a 1 m$^2$ membrane sheet 1800 configured as shown in FIG. 18(*a*), which is the same as that shown in FIG. 13 described above. The membrane sheet 1800 has first and second ends 1801, 1802 spaced apart along the first direction 1850 and first and second sides 1803, 1804 spaced apart along the second direction, which is transverse to the first direction 1850. The second portion 1806 is formed of a selective membrane but has a higher permeance for the major component than the first portion 1805. The second portion 1806 extends along the outer edge formed by the second side 1804. The second portion 1806 is a strip having its length extending in the first direction 1850. The remainder of the membrane sheet 1800 is the first portion 1805 formed of a selective membrane having a lower permeance for the major component than the second portion 1806. The flow of feed fluid is from the first end 1801 to the second end 1802 along the first direction 1850. The flow of permeate fluid is along the second direction (i.e. transverse, specifically perpendicular to the flow of feed fluid). The feed fluid and residue fluid flow along a first major surface. The permeate fluid flows along a second major surface, which is opposite from the first major surface.

The second portion is a thin membrane made from silicone rubber (PDMS) with a $CO_2$ permeance of 4,800 gpu and a $N_2$ permeance of 600 gpu $CO_2/N_2$ selectivity of 8. The first portion is a Polaris $CO_2/N_2$-selective membrane made by Membrane Technology and Research, Inc. (MTR) with a $CO_2$ permeance of 1,800 gpu and a $N_2$ permeance of 60 gpu ($CO_2/N_2$ selectivity of 30). In this example, the $N_2$ permeance of the second portion 1806 (the high permeance strip) is 10 times larger than the $N_2$ permeance of the first portion 1805 (the remainder of the membrane sheet).

These calculations were performed using a differential element computer simulation of the process.

In this set of examples, the area of the second portion 1806 of the membrane sheet 1800 is varied from 0 to 30%. The calculated performance is shown in Table 1 below. When the area of the second portion is set at zero, the membrane performs as a simple Polaris crossflow module with an area of 1.0 m$^2$. If the feed flow rate of this crossflow modules is set at 0.76 scfm, then the membrane will produce a treated residue gas containing 6.0% $CO_2$ and the permeate gas contains 38.8% $CO_2$.

surprisingly improved by providing a second portion 1806 having an area between 1% and 14% of the total area of the membrane sheet 1800. The greatest improvement in membrane performance due to the sweep effect is achieved when the second portion 1806 is approximately 4% of the total area of the membrane sheet 1800.

When the second portion 1806 is 4% of the total area of the membrane sheet 1800, the flow rate of feed gas can be increased by almost 50% to 1.13 scfm and the permeate $CO_2$ concentration also increases from 38.8% $CO_2$ to 40.9%. The membrane sheet still produces 6% $CO_2$ in the treated, residue gas.

When the area of the second portion 1806 is 14% of the total area of the membrane sheet 1800, the flow rate of feed gas can be increased to approximately 1.7 scfm, which is more than double the flow rate of the feed gas for the membrane sheet with no second portion 1806 (i.e with no sweep effect) and the permeate $CO_2$ concentration is still maintained at 38.8%. The membrane sheet still produces 6% $CO_2$ in the treated gas.

When the area of the second portion 1806 is increased to 30% of the total area of the membrane sheet 1800, the flow rate of feed gas can be increased to approximately 2.24 scfm, which is nearly three times the flow rate of the feed gas for the membrane sheet with no second portion 1806 (i.e. with no sweep effect) and the permeate $CO_2$ concentration is still sufficient at 34.53%. The membrane sheet still produces 6% $CO_2$ in the treated gas.

Therefore, by providing the second portion 1806 which generates a sweep effect, a process having the same permeate concentration can be run at more than double the flow

TABLE 1

Variation of Membrane Area of High Permeance Sweep Membrane

| | Membrane | Area | $CO_2$ | N2 | Sel. |
|---|---|---|---|---|---|
| Feed: 12% $CO_2$ in $N_2$, 1.1 atm, flow rate varies, Residue: 6% $CO_2$ | Second portion PDMS | varies | 4,800 gpu | 600 gpu | 8 |
| Permeate: 0.2 atm | First portion Polaris | varies | 1,800 gpu | 60 gpu | 30 |

| Second portion area (m$^2$) | First portion area (m$^2$) | Feed (scfm) | Permeate fluid generated by second portion (scfm) | Total permeate fluid (scfm) | Permeate $CO_2$ generated by second portion (i.e Sweep $CO_2$) (%) | Total permeate $CO_2$ (%) | Membrane module flux relative to crossflow (−) |
|---|---|---|---|---|---|---|---|
| 0 | 1 | 0.76 | 0 | 0.14 | — | 38.84 | 1.00 |
| 0.04 | 0.96 | 1.13 | 0.04 | 0.19 | 13.66 | 40.89 | 1.48 |
| 0.12 | 0.88 | 1.58 | 0.12 | 0.29 | 17.89 | 39.16 | 2.09 |
| 0.3 | 0.7 | 2.24 | 0.32 | 0.47 | 22.03 | 34.53 | 2.95 |

Data for the example shown in Table 1 above is shown in FIG. 18. The upper line with the diamond shaped points indicates the variation of permeate $CO_2$ concentration with area of the second portion 1806. The lower line with the square shaped points indicates the variation of feed flow rate with area of the second portion 1806. It was expected that as the area of the second portion was increased from 0%, the permeate $CO_2$ concentration would decrease. However, when the area of the second portion 1806 is between 1% and 14% of the total area of the membrane sheet 1800, the permeate $CO_2$ concentration is surprisingly actually greater than with no second portion 1806 (i.e. with no sweep effect). Accordingly, the performance of the membrane sheet is rate. This means that the total area of the membrane sheet can be reduced to less than half. Increasing the flow rate is therefore desirable as this provides a more efficient membrane module, which in turns allows smaller membrane sheets to be used while achieving the same/similar separation.

Therefore, FIG. 18 shows a characteristic feature of our crossflow sweep module, that is different from counterflow sweep modules. In counterflow sweep modules, the use of a sweep can produce a significant increase in the membrane flux by changing the driving force for permeation, but the concentration of the permeating component in the final permeate always decreases. Process developers choose the amount of sweep needed by balancing the improvement in membrane flux against the decrease in permeate concentration. In contrast, in our invention, there is an initial increase in permeate concentration when sweep is used, as well as an increase in permeate flux. Indeed, in this crossflow module, the concentration of the permeating component increases when the area of the second portion is between 1% and 14% of the total area. If the flow of sweep is increased, the flux continues to increase and the permeate concentration increases, then plateaus, and finally begins to fall. The region between the point where the area of the second portion is 0% of the total area and the point where the area of the second portion is 14% of the total area (i.e. the point where the sweep is zero (the 100% crossflow case) and the point where the sweep is large enough to bring the permeate concentration back to the 100% crossflow permeate $CO_2$ concentration value), is a preferred operating region for sweep flow. At all points, in this region the sweep effect elevates both the flux and the permeate concentration of the minor component above that of a simple crossflow module without a sweep effect. In this operating region, the trade-off between membrane flux and permeate concentration that occurs with counterflow sweep operation does not occur.

If the area of the second portion is increased to 12% of the total area, the flow rate can be increased even more to 1.58 scfm, more than twice the initial gas flow, while the membrane still produces 6% $CO_2$ in the treated gas, and the permeate $CO_2$ concentration still exceeds the values obtained without sweep. These results show the very substantial improvement in separation performance brought about by the use of an internal permeate sweep.

Example 2

The internal permeate sweep effect in Example 1 above was created by second portion formed of a PDMS membrane which has a $CO_2/N_2$ permeance of about 8. Our invention is not limited to a membrane type for the second portion. The key properties required of the second portion of the membrane sheet is that it have a lower selectivity than the first portion of the membrane sheet (the main portion) and a higher permeance for the feed gas mixture so as to create a high flux of gas from a relatively small sweep membrane area (the sweep membrane area being the area of the second portion). If the second portion is also selective for the separation being performed, this is beneficial, but is not required.

Table 2 shows the calculated performance of the same membrane configurations as in Example 1, but differing in that the area of the second portion 1806 is fixed at 12% of the total membrane area. The $N_2$ permeance of the second portion 1806 (the sweep area) is again fixed at 10 times the first portion 1805 (the main area) in the Example 1 value, but the $CO_2$ permeance of the second portion 1806 is varied to change the membrane selectivity of the second portion 1806. The first row of calculations in Table 2 shows the membrane performance when the second portion 1806 of the membrane sheet 1800 has PDMS properties, a $CO_2$ permeance of 4,800 gpu and a $CO_2/N_2$ selectivity of 8. The other rows show the impact of reducing the $CO_2/N_2$ selectivity of the second portion from 8 to a completely unselective membrane with a selectivity of 1. Reducing the selectivity of the second portion does reduce the $CO_2$ concentration in the permeate gas and reduce the effect of sweep on the volume of gas the module can separate, but the overall result obtained is still very good.

TABLE 2

Variation of Selectivity of High Permeance Sweep Membrane

| | Membrane | Area | $CO_2$ | $N_2$ | Sel |
|---|---|---|---|---|---|
| Feed: 12% $CO_2$ in $N_2$, 1.1 atm, flow rate varies | Second portion varies | 0.12 | varies | 600 gpu | varies |
| Residue: 6% $CO_2$, Permeate: 0.2 atm | First portion Polaris | 0.88 | 1,800 gpu | 60 gpu | 30 |

| Second portion $CO_2$ permeance (gpu) | Second portion $CO_2/N_2$ selectivity | Feed (scfm) | Permeate generated by second portion (scfm) | Total permeate (scfm) | Permeate $CO_2$ generated by second portion (sweep $CO_2$) (%) | Total permeate $CO_2$ (%) | Membrane module flux relative to crossflow module (−) |
|---|---|---|---|---|---|---|---|
| 4,800 | 8 | 1.58 | 0.12 | 0.29 | 22.0 | 39.2 | 2.09 |
| 2,400 | 4 | 1.53 | 0.12 | 0.28 | 17.0 | 38.7 | 2.02 |
| 1,200 | 2 | 1.46 | 0.11 | 0.27 | 15.1 | 38.1 | 1.93 |
| 600 | 1 | 1.38 | 0.10 | 0.65 | 12.0 | 37.6 | 1.83 |
| simple crossflow (i.e. no sweep) | | 0.76 | 0 | 0.14 | — | 38.04 | 1.00 |

Figure 19:
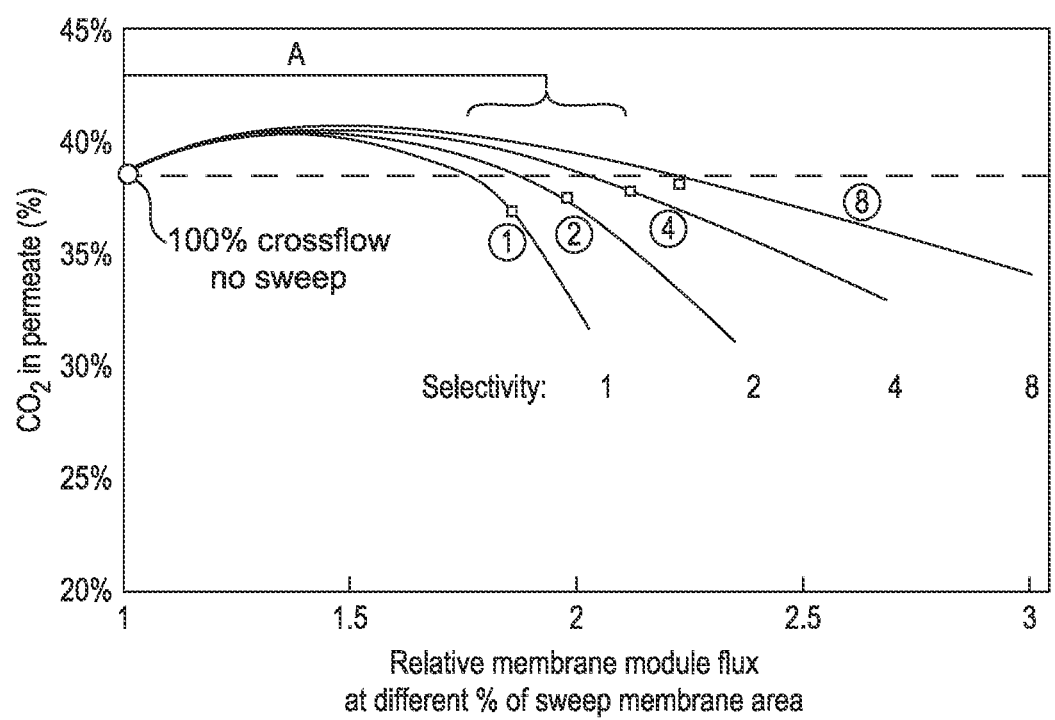

A plot of the $CO_2$ concentration plotted against the membrane module flux relative to a 100% crossflow module with no sweep effect for the example shown in Table 2 above is shown in FIG. 19. The labeled point on the axis shows the performance of a 100% crossflow module with no second portion (i.e. no sweep area). This module produces a permeate with a concentration of 38.8% $CO_2$. The change in the membrane flux and $CO_2$ permeate concentration is plotted for membranes with a $CO_2/N_2$ selectivity of 8, 4, 2, and 1.

The case marked with a concentration selectivity of 8 is the same as the concentration curve shown in Table 2. The other curves show the permeate concentrations at different selectivities. The four points shown on the figure are the data points for the calculations shown in Table 2 where the area of the second portion was fixed at 12% of the total area.

the membrane sheet. As the pressure ratio increases and the module moves further away from the pressure ratio controlled region and the increase in flux produced by the sweep becomes smaller. However, even at a pressure ratio of 22, when the entire module is outside the pressure ratio controlled region, a useful increase in flux through the membrane sheet is obtained.

TABLE 3

Variation of Feed/Permeate Pressure ratio

| | Membrane | Area | $CO_2$ | N2 | Sel. |
|---|---|---|---|---|---|
| Feed: 12% $CO_2$ in N2, 1.1 atm, flow rate varies | Second portion PDMS | 0.12 | 4,800 gpu | 600 gpu | 8 |
| Residue: 6% $CO_2$, Permeate: pressure varies | First portion Polaris | 0.88 | 1,800 gpu | 60 gpu | 30 |

| Permeate pressure (atm) | Pressure ratio | Feed (scfm) | Permeate generated by second portion (scfm) | Total permeate (scfm) | Permeate $CO_2$ generated by second portion (sweep $CO_2$) (%) | Total permeate $CO_2$ (%) | Membrane module flux relative to crossflow |
|---|---|---|---|---|---|---|---|
| 0.05 | 22 | 4.09 | 0.33 | 0.58 | 30.7 | 48.3 | 1.49 |
| 0.1 | 11 | 2.70 | 0.15 | 0.47 | 24.2 | 49.2 | 1.57 |
| 0.2 | 5.5 | 1.58 | 0.12 | 0.29 | 22.0 | 39.2 | 2.09 |
| 0.3 | 2.75 | 0.97 | 0.11 | 0.23 | 13.3 | 31.5 | 4.80 |

FIG. 19 shows, as in FIG. 18, that the permeate concentration initially increases with increased sweep flow and then falls. This unexpected result is produced by sweep in crossflow modules and as a consequence, the area labelled A in FIG. 19 represents the most preferred performance region. In this region, the membrane flux is up to two-fold higher than the 100% crossflow data, but the $CO_2$ concentration is above that of the crossflow no-sweep module.

Example 3

Another performance variable that can change is the pressure ratio across the membrane sheet 1800. In Examples 1 and 2, the pressure ratio is set at 5.5. (1.1 bar/0.2 bar) and the membrane used is MTR's Polaris membrane with a selectivity of 30. Under the conditions of these calculations, the Polaris membrane is in the pressure ratio limited controlled region throughout the module. Without sweep effects, the maximum permeate concentration at the feed end of the module is given by equation 5 as 66% $CO_2$ (12% $CO_2$×1.1 bar/0.2 bar) and at the permeate end 33% $CO_2$ (6% $CO_2$×1.1 bar/0.2 bar). When the permeate pressure is reduced to 0.1 bar, the first end 1801 of the module is outside the pressure ratio region, and module transitions from outside to inside the pressure ratio region as the $CO_2$ feed gas flows through the module and $CO_2$ is removed and the concentration of $CO_2$ in the gas falls. At the second end of the module, the gas is in the pressure ratio controlled region (6% $CO_2$×1.1 bar/0.1 bar).

When the permeate pressure is reduced to 0.05 bar, the pressure ratio is 22 and the membrane module is outside the pressure ratio region throughout the module. Table 3 illustrates the effect of these changes to pressure ratio on membrane performance all with the same second portion, the area of the second portion being 12% of the total area of Example 4

In Examples 1 to 3 described above, the invention has been illustrated using membranes selective for $CO_2/N$ but our invention can be applied to a wide variety of gas separation and pervaporation problems. Table 4, for example, shows some calculations performed for a membrane process to separate helium from natural gas. A number of natural gas streams contain small amounts of helium. Separating the gas is worthwhile since helium is in short supply and quite valuable. Cryogenic condensation and fractional distillation is usually used. The cost of these processes can be significantly reduced if the helium concentration can be increased and so membrane separation units are used as helium preconcentrators.

Table 4 shows a typical separation problem. The natural gas (mostly methane) is at high pressure and contains 1% helium. A number of membranes are known that have high helium/methane selectivities in the range of 100. The objective of the separation is to remove 90% of the helium into the low pressure (4 bar) permeate stream, a pressure ratio of 25. The entire module is comfortably within the pressure ratio limited region. The membrane has a second portion (sweep area) having a helium permeance of 1,000 gpu and a methane permeance of 100 gpu is used. In this example, the second portion has a $CH_4$ permeance 20 times the permeance of the first portion.

The first row in Table 4 shows the performance of a simple crossflow module with no second portion (i.e. no sweep area). The permeate contains 7.95% helium and a 1 $m^2$ module can treat 7.3 scfm of feed gas. The effect of using a permeate sweep is significant. The permeate helium concentration increases by 20% from 8.0% helium to 9.7%, and more importantly, the same 1 $m^2$ membrane module can treat much more gas.

TABLE 4

Removal of Helium from Natural Gas

|  | Membrane | Area | He | CH4 | Sel. |
|---|---|---|---|---|---|
| Feed: 1% He in CH4, 100 atm, flow rate varies | Second portion | varies | 1,000 gpu | 100 gpu | 10 |
| Residue 0.1% He, Permeate 4 atm | First portion | varies | 500 gpu | 5 gpu | 100 |

| Second portion ($m^2$) | First portion ($m^2$) | Feed (scfm) | Permeate generated by second portion (scfm) | Total permeate (scfm) | Permeate He generated by second area (sweep He) (%) | Total permeate He (%) | Membrane module flux relative to crossflow |
|---|---|---|---|---|---|---|---|
| 0 | 1 | 7.31 | 0 | 0.84 |  | 7.95 | 1.00 |
| 0.02 | 0.98 | 12.55 | 0.31 | 1.18 | 0.81 | 9.69 | 1.72 |
| 0.08 | 0.92 | 19.00 | 1.25 | 2.12 | 1.22 | 8.19 | 2.60 |

Example 5

Another example where the invention provides a useful result is the separation of light hydrocarbons from methane in natural gas processing plants, or from nitrogen in petrochemical plants. Table 5 illustrates a typical application, in this case the separation of butane from nitrogen in a polyolefin plant. The feed gas is 5% butane in nitrogen at 20 bar. The permeate gas is at 3 bar. Under the conditions of this experiment, the entire membrane module is in the pressure ratio limited region. The rubbery membranes usually used for this separation typically have a selectivity for butane/nitrogen of about 15. The second portion of the membrane sheet (the sweep area) used has a selectivity for butane/nitrogen of 8 and a nitrogen permeance of 125 gpu, so the permeance of the second portion to nitrogen is only a little more than 2 times the permeance of the first portion. Designers of these types of equipment will choose the optimum sweep area depending on the requirements of their processes.

TABLE 5

Removal of Butane from Nitrogen

|  | Membrane | Area | C4H10 | $N_2$ | Sel. |
|---|---|---|---|---|---|
| Feed: 5% C4H10 in $N_2$, 20 atm, flow rate varies | Second portion | varies | 1,000 gpu | 125 gpu | 8 |
| Residue: 0.5% C4H10, Permeate: 3 atm | First portion | varies | 900 gpu | 60 gpu | 15 |

| Second portion ($m^2$) | First portion ($m^2$) | Feed (scfm) | Permeate generated by second portion (scfm) | Total permeate (scfm) | Permeate C4H10 Generated by second portion (sweep C4H10) (%) | Total permeate C4H10 (%) | Membrane module flux relative to crossflow |
|---|---|---|---|---|---|---|---|
| 0 | 1 | 3.94 |  | 1.82 |  | 10.27 | 1.00 |
| 0.02 | 0.98 | 4.25 | 0.07 | 1.89 | 5.88 | 10.76 | 1.08 |
| 0.08 | 0.92 | 4.70 | 0.23 | 1.99 | 6.46 | 11.15 | 1.20 |
| 0.1 | 0.9 | 4.82 | 0.36 | 2.03 | 6.60 | 11.19 | 1.22 |
| 0.2 | 0.8 | 5.25 | 0.73 | 2.23 | 7.12 | 11.13 | 1.33 |
| 0.4 | 0.6 | 5.82 | 1.47 | 2.61 | 7.75 | 10.57 | 1.48 |

Example 6

Another example where the invention produces a useful result is pervaporation to dehydrate ethanol, a process widely used in the production of bioethanol. The performance of the module is shown in Table 6. The feed is 90 wt % ethanol and 10 wt % $H_2O$ at 100° C. The first portion has a water permeance of 2,500 gpu and a selectivity of 500. The second portion has a selectivity of 50 and an $H_2O$ permeance of 5,000 gpu. The area of the second portion is increased from 0% (a simple crossflow module) to 10% of the total area of the membrane sheet. When the sweep area is below about 5-6%, the membrane produces a permeate that is the same or better than the simple crossflow case (no sweep) but the membrane has up to twice the flux of the simple crossflow module (i.e. with no sweep effect).

TABLE 6

Removal of $H_2O$ from Wet Bioethanol

| | Membrane | Area | $H_2O$ | EtOH | Sel. |
|---|---|---|---|---|---|
| Feed: 10 wt % $H_2O$, 90 wt % EtOH @ 100° C. | Second portion | Varies | 5,000 gpu | 100 gpu | 50 |
| | First | Varies | 2,500 | 5 | 500 |

TABLE 6-continued

Removal of $H_2O$ from Wet Bioethanol

Residue: 1 wt % $H_2O$, 99 wt % EtOH, portion gpu gpu
Permeate: 10 cmHg

| Area second portion % | Area first portion % | Feed flow kg/h/m$^2$ | Total permeate $CO_2$ (%) | Membrane module flux relative to crossflow |
|---|---|---|---|---|
| 0.0 | 100 | 2.44 | 79.2 | 1.0 |
| 2.0 | 98 | 3.77 | 81.1 | 1.5 |
| 4.0 | 96 | 4.50 | 80.1 | 1.8 |
| 6.0 | 94 | 5.05 | 78.9 | 2.1 |
| 8.0 | 92 | 5.49 | 77.5 | 2.2 |
| 10.0 | 90 | 5.15 | 76.2 | 2.4 |

Although the data set out above is in respect of the configuration shown in FIG. 18(a), it will be appreciated that the advantages demonstrated by this data equally apply to the other configurations for the membrane sheet of the present invention described herein.

It will be clear from the above that the process could be applied to a number of pervaporation and gas separation applications. By way of example, some of these are listed in Table 7 below.

TABLE 7

| Feed Mixture | | First portion | | Second portion | |
|---|---|---|---|---|---|
| Minor Component | Major Component | Name of material | Major Component Permeance (gpu) | Name of material | Major Component Permeance (gpu) |
| Gas Separation | | | | | |
| $H_2$ | $CH_4$ | Polyimide | 5 | Polydimethylsiloxane, $CH_3[Si(CH_3)_2O]_nSi(CH_3)_3$ (PDMS) | 50 |
| $H_2$ | $CO_2$ | Phosphonium-based ionic liquid (PBIL) | 5 | PDMS | 50 |
| $CO_2$ | $H_2$ | Polaris (a polyethylene-oxide based membrane) | 100 | PDMS | 500 |
| C2-C5 hydrocarbons | $CH_4$ | PDMS | 100 | Polaris | 300 |
| Pervaporation | | | | | |
| $H_2O$ | Isopropanol $(C_3H_8O)$ | Polyvinyl alcohol, $(C_4H_6O_2)_n$ (PVA) | 10 | PDMS | 200 |
| $H_2O$ | Acrylonitrile $(C_3H_3N)$ | PVA | 10 | PDMS | 200 |
| Toluene $(C_6H_5CH_3)$ | Methyl Cyclohexane $(CH_3C_6H_{11})$ | Hyflon AD60 (tetrafluoroethylene-co-2,2,4-trifluoro-5-trifluoromethoxy-1,3-dioxole, $(C_4F_6O_3)_n(C_2F_4)_m$) | 100 | Pebax 1657 (a compound made from a polyether block amide, commercially available from Arkema Group, having the general structure of HO—(CO—PA—CO—O—PE—O)$_n$—H. This compound is generally prepared by condensing a carboxylic acid polyamide with an alcohol termination polyether (polytetramethylene glycol (PTMG) or polyethelyne glycol (PEG) | 200 |

TABLE 7-continued

| Feed Mixture | | First portion | | Second portion | |
|---|---|---|---|---|---|
| | | | Major Component | | Major Component |
| Minor Component | Major Component | Name of material | Permeance (gpu) | Name of material | Permeance (gpu) |
| Ethyl Acetate ($CH_3CO_2CH_2CH_3$) | $H_2O$ | PDMS | 100 | Pebax 1657 | 1,000 |

Information Useful for Understanding the Invention

Figure 1:
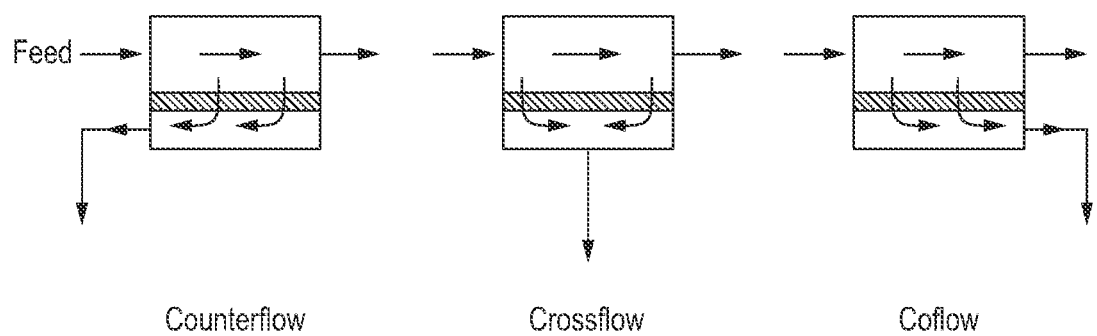
FIG. 1 is a schematic diagram of known configurations of counterflow, cross-flow and co-flow membrane modules.

The three general membrane module configurations currently known are shown in FIG. 1. In the designs shown, the feed fluid flows from left to right along the membrane surface. A portion of the feed fluid permeates through the membrane forming the permeate fluid. The configurations differ in the flow direction of the permeate fluid relative to the feed fluid as the fluid moves to the outlet. In a counterflow module, the permeate fluid flows right to left opposite to the flow of feed fluid on the other side of the membrane. In a crossflow module, the permeate fluid flows at right angles to the feed fluid flow. In a coflow module, the permeate fluid flows in the same direction as the feed fluid.

In general, when using the same membrane, the separation obtained and the membrane area required to perform the separation are different for the three configurations in the order; counterflow better than crossflow better than coflow. In many applications, the separation performance obtained with the same membrane for the three different module designs is small, but in others, especially when the membrane separation is pressure ratio limited, as described below, the difference is significant. This result suggests that counterflow modules are a preferred module configuration. However, counterflow modules are mechanically more difficult to make than crossflow modules. Various work arounds to this problem have been described but are not widely adopted, and so crossflow modules are used in many, perhaps a majority, of gas separation and pervaporation applications. Coflow modules are rarely used. These issues are discussed in many membrane texts, for example, chapters 3, 4, 8 and 9 of Baker, R. W., *Membrane Technology and Applications,* 3rd Edition, (2012), John Wiley and Sons.

In the discussion that follows, we will for the most part illustrate our invention for simplicity by using gas permeation examples. However, the improved module of this invention is equally applicable to pervaporation as we will show later.

The difference in the separation performance of the three module configurations shown in FIG. 1 is a driving force issue. The flow of components on the feed side of membrane to the permeate side of the membrane side is proportional to the difference in partial pressure driving force of each component across the membrane. The partial pressure on the feed side of the membrane is $n_{i_o} p_o$ (molar concentration $n_{i_o}$, pressure $p_o$) and on the permeate side of the membrane it is $n_{i_l} p_l$ (molar concentration $n_{i_l}$, pressure $p_l$). And thus, the partial pressure driving force is given by:

$$\Delta p_i = n_{i_o} p_o - n_{i_l} p_l$$

In the absence of all other effects, the molar concentration at any point on the permeate side of the membrane is determined by the concentration of gas permeating the membrane. But, depending on the gas flow configuration in the permeate channel, the permeating gas concentration can be changed by mixing with gas from other parts of the permeate channel.

In the module configurations shown in FIG. 1, the concentration of the most permeable components decreases as the gas passes left to right through the module. This means the concentration of the most permeable components of the gas permeating the membrane also decreases left to right along the membrane. In a counterflow module, the flow of permeate gas, right to left, has a beneficial effect on permeation because the gas mixing with the permeate gas dilutes the incoming permeate, reducing the concentration of the most permeable component and so increasing the driving force across the membrane. In a coflow module, permeate gas flow has the opposite effect and increases the permeate concentration when mixed with the incoming permeate. This decreases the driving force for permeation across the membrane and the flux falls. In a crossflow module, the permeate gas flow has the same concentration as the incoming permeate and mixing does not affect the membrane separation.

The magnitude of the difference between the different module configurations is a function of several factors, including the membrane selectivity ($\alpha_{i/j}$) that is, the ratio of the permeability of components i and j;

$$\alpha_{i/j} = \frac{P_i}{P_j}$$

As well as the pressure ratio across the membrane written as:

$$\theta = \frac{p_o}{p_\ell}$$

and the molar concentration of the more permeable component on the feed side of the membrane, $n_{i_o}$.

Figure 2:
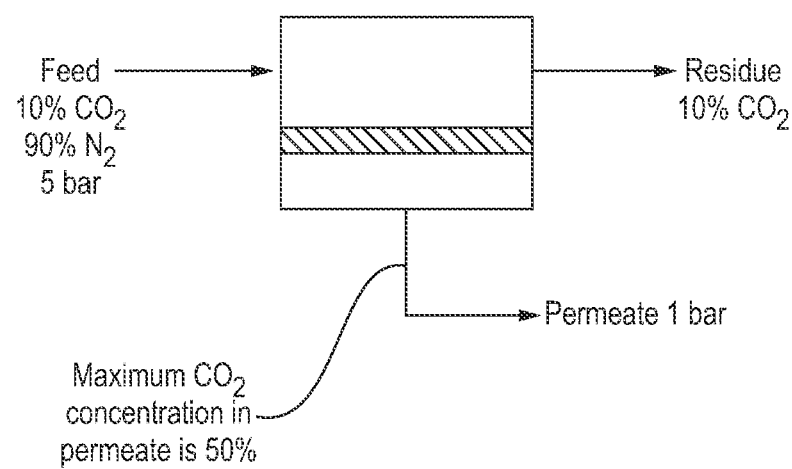
FIG. 2 is a schematic diagram that includes example calculation demonstrating the separation efficiency of a known membrane module where the separation that can be achieved is pressure ratio controlled.

By way of example to illustrate these effects, consider the separation illustrated in FIG. 2. In this example, only a very small amount of the permeable gas $CO_2$ is removed from the feed as it moves left to right along the membrane. This means the concentration of $CO_2$ on the permeate side of the membrane is everywhere about the same, and the difference between counterflow, crossflow and coflow is very small. As described earlier, membrane permeation only occurs if the partial pressure of the permeate side of the membrane is less than the feed, that is $$n_{i_l} p_\ell \leq n_{i_o} p_o \tag{3}$$

This inequality can be rearranged to:

$$\frac{n_{i_\ell}}{n_{i_o}} \leq \frac{p_o}{p_\ell} \quad (4)$$

which shows that the enrichment of the permeating component ($CO_2$) is always less than the pressure ratio (feed pressure/permeate pressure). It also follows that the concentration of the permeating component ($CO_2$) can never be more than the expression:

$$n_{i_\ell} \leq n_{i_o} \times \frac{p_o}{p_\ell} = n_{i_\ell}^{max} \quad (5)$$

For the example in FIG. 2, this means that $n_{i_\ell}$ cannot be greater than 50% $CO_2$ ($n_{i_o}$=10% $CO_2$ and $$\frac{p_o}{p_\ell} = \frac{5 \text{ bar}}{1 \text{ bar}})$$

no matter how selective the membrane. This result has several implications, first at least half of the permeate must be the slow component ($N_2$) and it is permeation of the slow component that determines the membrane area required to treat a specific amount of feed fluid. Also, as the selectivity of the membrane increases, the amount of membrane area required to permeate the same amount of $CO_2$ increases. In the limit of infinite selectivity, no slow component permeates, hence infinite membrane area is required.

A membrane process is considered to be well within the pressure ratio limited region if the maximum permeate concentration $n_{i_\ell}^{max}$ given by equation 5 is less than 100%. In this region, the effect of module configuration is generally noticeable. The differences are even more significant if, in addition, the membrane selectivity is larger than the pressure ratio, and will be even more significant if the membrane selectivity is more than two or three times larger than the pressure ratio. When this is the case, a significant difference between counterflow, crossflow and coflow membrane modules is produced. Some of the issues of pressure ratio and its effect on membrane separation are discussed in detail by Huang, et al., Journal of Membrane Science, 463, 33 (2014).

One way to mitigate the pressure ratio limitation described above is to use a membrane sweep. These devices are described in a number of standard texts and patents. FIG. 3 shows the design of various external sweep separation processes applied to counterflow membrane modules to improve the modules' performance. Consider the processes shown in FIG. 3a first. Feed fluid, which may be a gas or liquid (301) passes across the surface of a selective membrane (306) while a sweep fluid (304), generally 2-10% of the feed flow, is passed across the permeate side of the membrane. A driving force for permeation is generated in part by the difference in pressure across the membrane, but also because of concentration (partial pressure) difference generated by the sweep. For this process to be effective, it is necessary that the flow rate of the sweep fluid (304) be carefully controlled. Processes employing this type of external sweep fluid are described, for example, in U.S. Pat. Nos. 4,824,443; 6,515,725; 7,153,343 and 8,246,718

An alternative type of external sweep process called a residue sweep process is illustrated in FIGS. 3b and 3c. In the case of the gas separation module shown in FIG. 3b, a portion of the treated residue fluid (318) is expanded across a valve (320) and is introduced to the permeate side of the module (325) at the residue end. The change in separation depends on how much of the residue fluid (321) is used as a sweep. Typically about 2 to 10% of the residue fluid is used. The sweep flow dilutes the permeate fluid and increases the flow of the permeate component of the feed across the membrane. The flux through the membrane increases although the permeate concentration falls. Pervaporation sweep, shown in FIG. 3c, is similar except the residue stream (309) has to be vaporized by evaporator (313) before it can be used as sweep. Processes employing this type of external sweep are described, for example, in U.S. Pat. Nos. 5,444,540 and 5,205,842.

A final type of external sweep fluid generation method that has occasionally been used is shown in FIG. 3d. Such a device has been described, for example, in U.S. Pat. No. 5,383,956. In this device, the control valve (320) shown in FIG. 3b, or the control valve (311) to evaporator (313) shown in FIG. 3c are replaced with a second membrane unit (320). The permeate fluid from the unit (322) is then sent to the main separation module (318) to produce a counterflow sweep effort on the permeate side of the module.

All of the process designs shown in FIG. 3 use a sweep fluid stream generated externally to the module. The fluid is then delivered to the permeate side of the membrane at the residue end of the module to produce a counterflow sweep effect. One of the problems with this type of arrangement is the piping and valves needed to introduce a controlled flow of fluid into the module.

A number of attempts have been made to overcome the shortcomings of external sweep devices. Two such attempts are illustrated in FIGS. 4 and 5 from U.S. Pat. No. 4,687,578 to Stookey and U.S. Pat. No. 6,740,140 to Giglia, et al. The '578 device illustrated in FIG. 4 is a counterflow hollow fiber module device in which one end of the fiber is not coated with a selective membrane layer. An enlarged view of one fiber is shown in FIG. 4a. Most of the fiber is coated with a selective layer (401) but the end portion of the fiber (403) is not coated. This portion of the fiber has no selectivity but will have a much higher permeance than the main portion of the fiber, and so the feed fluid that permeates here (409) can act as a flow of residue sweep fluid (409). In this way, an internally generated counterflow of residue sweep fluid is produced.

A similar device is shown in FIG. 5, taken from U.S. Pat. No. 6,740,140 to Giglia, et al. As with the '578 patent device, the base module is a counterflow hollow fiber module with shell-side feed. The feed fluid (502) enters at one end of the module and flows left to right in the spaces between the hollow fibers (505). A residue pipe extends through the module terminating just short of the right-hand end of the module (509). As the feed fluid flows between the hollow fibers, a portion permeates the fiber membrane and travels inside the fiber left to right (countercurrent to the feed) leaving through the permeate port (503). Most of the feed fluid that does not permeate the hollow fiber membrane is removed through holes in the residue collection pipe (512). The end of the residue collection pipe is sealed with a plug perforated by a small orifice (511). A portion of the treated residue fluid leaks through this orifice and can then enter the open ends of the fibers (514), thus creating the desired residue fluid counterflow sweep effect. The use of internal sweep devices has been limited to non-counterflow, hollow fiber devices of the type described in the '140 and '578 patents. Internal sweep has not been applied to flat sheet spiral-wound or plate-and-frame modules of the type described in this application. We will show that, by using the design described in this application, it is possible to obtain the advantages of internally generated sweep in these devices too.

Figure 7:
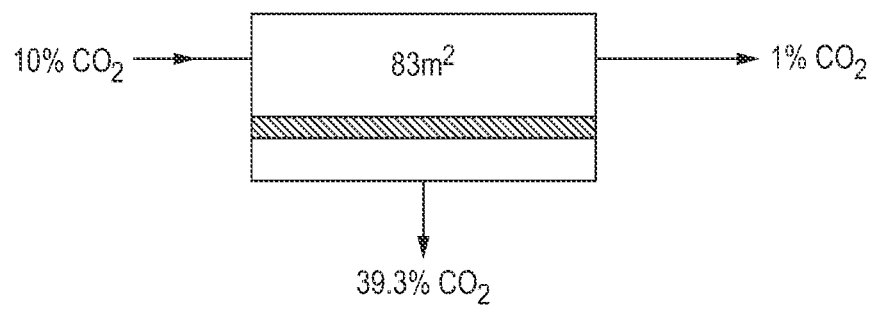
Figure 7:
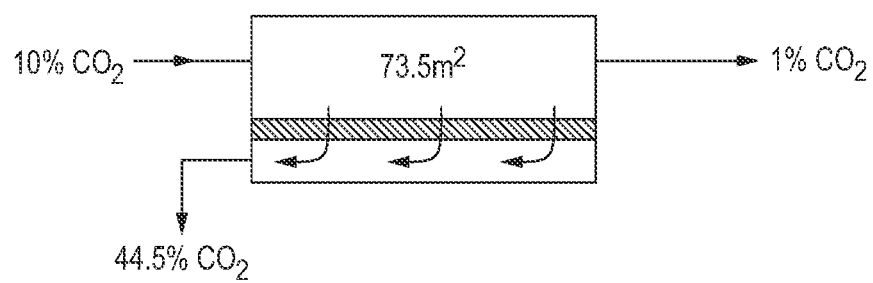
Figure 7:
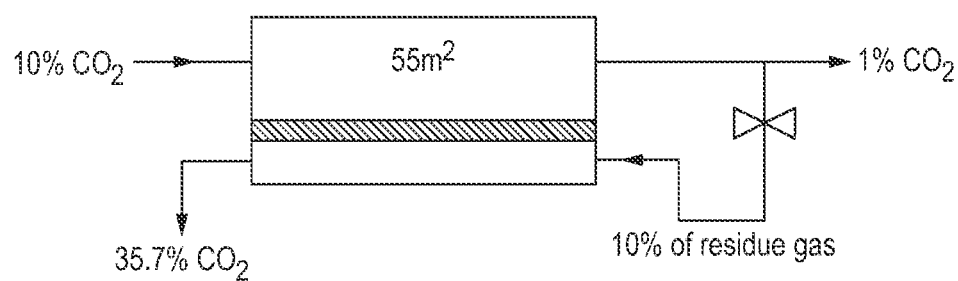

Two concrete sets of examples illustrating the beneficial effect of a controlled sweep with counterflow modules are shown in FIGS. 6 and 7. In the FIG. 6 examples, a 1000 std m³/h feed fluid at 5 bar containing 10% $CO_2$ is treated with crossflow, counterflow and coflow modules with 10% external sweep. The pressure ratio is 5 so the entire membrane module is in the pressure ratio limited region. Also, the membrane has a $CO_2/N_2$ selectivity of 30. This is 6 times larger than the pressure ratio, so counterflow and sweep are expected to have a substantial effect, and this is the case. The counterflow module needs 36% less membrane area to achieve the same $CO_2$ removal, and produces a significantly higher concentration permeate than the crossflow module. Using a counterflow module with an additional 10% sweep from the residue fluid stream reduces the permeate concentration but produces a further 18% reduction in the area needed to do the separation than the crossflow module.

In the FIG. 7 example, the same set of examples is shown, with the difference being that the feed pressure is set at 20 bar and so the pressure ratio is 20. As a consequence, although the counterflow and sweep examples are better than the crossflow module results, the effect is less significant. This is because at a pressure ratio of 20 and a feed concentration of 10%, part of the membrane module at the feed end is outside of the pressure ratio limited region. At the feed end of the module at a pressure ratio of 20, Equation 5 shows the maximum theoretical value $CO_2$ in the permeate is 200%, so the feed end of the module is well outside the pressure ratio limited area. At the residue end of the module, the feed fluid concentration is only 1% $CO_2$, so the maximum concentration in the permeate given by Equation 5 is then 20% and so this portion of the module is in the pressure ratio limited region. The module transitions into the pressure ratio controlled region at the point in the module when the feed fluid concentration is 5% $CO_2$. Because the module is only partially in the pressure ratio limited region, the counterflow module now only uses 11% less membrane area and the permeate concentration is only slightly more than the crossflow result. The counterflow sweep module also uses less area, but now the permeate $CO_2$ concentration is lower than crossflow results. This is because under conditions of this test, 10% sweep is too large. Reducing the sweep to 5% produces a better result. The required area to do the separation is then 60 m², a 16% reduction in area compared to simple counterflow, and the permeate concentration is 40.8% $CO_2$, less than the counterflow example but still better than the crossflow case.

Gas separation and pervaporation processes that could benefit from sweep operation often use crossflow modules, which are mechanically easier to build and operate, especially for flat sheet membranes formed into spiral-wound and plate-and-frame module geometries.

Creating an external sweep effect with spiral-wound or plate-and-frame modules is possible, but requires significant modification to the module's construction. The internal sweep process as described in our invention is much easier to apply and produces a better result. Also, all modules using an external sweep regime require good control of the sweep flow rate for reliable operation. The controls that can achieve this level of precision with external sweep devices are not cheap and must be fitted on to every module where sweep will be used. In an industrial plant, this may be tens to hundreds of control units, and the failure of even one unit could lead to a large uncontrolled leak of fluid from the residue to the permeate stream, affecting the operation of the whole plant.

Another problem with many of the sweep processes described hitherto is that the sweep is produced by expanding the residue gas or liquid from the module through a valve as shown in FIGS. 3a and 3b. This process essentially throws away an extra potential separation step. As we will show, a better approach is to incorporate a partial separation into the sweep-generating process. This is one of the innovations of our process.

First Set of Clauses

The present invention may also be described by the following first set of clauses:

Clause 1. A crossflow membrane module configured to separate feed fluid comprising a minor component and a major component into permeate fluid and residue fluid, wherein the residue fluid has a lower concentration of the minor component than the feed fluid and the permeate fluid has a higher concentration of the minor component than the feed fluid, the module comprising:

a housing having a first end and a second end, wherein the second end is spaced apart from the first end along a first direction, one or more membrane sheet(s) extending between the first and second ends of the housing, wherein each membrane sheet comprises a first end and a second end, wherein the second end is spaced apart from the first end along the first direction, wherein each membrane sheet comprises first and second sides extending between the first and second ends, wherein the first side is spaced apart from the second side along a second direction, wherein the second direction is transverse to the first direction, wherein each membrane sheet comprises a first major surface and a second major surface, wherein the second major surface is opposite from the first major surface, wherein each membrane sheet is configured to separate the feed fluid into the residue fluid and the permeate fluid, wherein the membrane module is configured such that the feed fluid and the residue fluid flow along the first major surface of each membrane sheet in the first direction but do not flow along the second major surface of each membrane sheet and the permeate fluid flows along the second major surface of each membrane sheet but does not flow along the first major surface of each membrane sheet;

the membrane module further comprising:

an inlet at the first end of the housing, wherein the inlet is in fluid communication with the first end of the first major surface of each membrane sheet and is configured to deliver the feed fluid such that it flows along the first major surface of each membrane sheet;

an outlet at the second end of the housing, wherein the outlet is in fluid communication with the second end of the first major surface of each membrane sheet and is configured to receive and output the residue fluid separated from the feed fluid; and a conduit adjacent to the first side of the second major surface of the membrane sheet, wherein the conduit is configured to receive and output the permeate fluid separated from the feed fluid;

wherein at least one of the one or more membrane sheet(s) comprises a first portion and a second portion such that separation of the feed fluid across the first portion generates a first part of the permeate fluid and separation across the second portion generates a second part of the permeate fluid,
wherein the second portion of the membrane sheet has a greater permeance for the major component than the first portion such that the second part of the permeate fluid has a higher concentration of the major component than the first part of the permeate fluid;
wherein the second portion is spaced apart from the first side of the membrane sheet along the second direction thereby causing the second part of the permeate gas to flow towards the first side of the membrane sheet such that the second part of the permeate gas mixes with the first part of the permeate gas thereby reducing the concentration of the minor component in the first part of the permeate fluid.

Clause 2. The membrane module of clause 1, wherein the conduit extends along at least 50%, preferably at least 70%, more preferably at least 80% of the length of the first side in the first direction.

Clause 3. The membrane module of clause 1 or clause 2, wherein the conduit is aligned with the first side of each membrane sheet.

Clause 4. The membrane module of clause 1, wherein the module further comprises a second conduit, wherein the second conduit is in fluid communication with the second side, wherein the second conduit is configured to receive and output the permeate fluid separated from the feed fluid, wherein the second portion is spaced apart from both the first side and the second side along the first direction.

Clause 5. The membrane module of any one of clauses 1 to 4, wherein the second portion extends along the first direction between the first end and the second end, preferably wherein the second portion is formed as a strip, more preferably wherein the second portion is equidistant between the first side and the second side.

Clause 6. The crossflow membrane module of any one of clauses 1 to 4, wherein the crossflow membrane module is spiral-wound,
wherein the conduit is a central tube extending along the first direction,
wherein the one or more membrane sheet(s) are wound around the central tube so as to define a spiral perpendicular to the first direction, such that the first side of the one or more membrane sheet(s) is closer to the central tube than the second side,
wherein the central tube comprises a cylindrical surface and first and second terminal ends defining a lumen therebetween,
wherein the central tube comprises one or more opening(s) in the cylindrical surface, wherein the one or more opening(s) are configured to receive the permeate fluid separated from the feed fluid, wherein the one or more opening(s) are in fluid communication with the first side of the membrane sheer,
wherein the central tube further comprises an outlet configured to output the permeate fluid received by the one or more opening(s), wherein the outlet is in the first or second terminal ends of the central tube.

Clause 7. The membrane module of clause 6, wherein the one or more opening(s) are spaced apart from each other along the first direction, preferably wherein the axial range of the one or more opening(s) overlap with the axial range of the second portion in the first direction, more preferably wherein the one or more opening(s) are aligned with the first side.

Clause 8. The membrane module of any preceding clause, wherein the second portion of the one or more membrane sheet(s) extends along an outer edge of the one or more membrane sheet(s).

Clause 9. The membrane module of clause 8, wherein the second portion extends along at least a portion of the second side, preferably, wherein the second portion extends along the entire edge formed by the second side.

Clause 10. The membrane module of any preceding clause, wherein the module further comprises:
one or more feed spacers configured to space apart the one or more membrane sheets, wherein each feed spacer is for defining a fluid path for the flow of feed fluid and residue fluid to the outlet; and
one or more permeate spacers configured to space apart the one or more membrane sheets, wherein each permeate spacer is for defining a fluid path for the flow of permeate fluid to the conduit.

Clause 11. The membrane module of clause 10, wherein a first membrane sheet of the one or more membrane sheets is arranged such that a feed spacer is adjacent to the first major surface of the first membrane sheet and a permeate spacer is adjacent to the second major surface of the first membrane sheet.

Clause 12. The membrane module of clause 10 or clause 11 wherein the membrane sheets, the one or more feed spacers and the one or more permeate spacers are arranged in a stacked configuration, wherein each space between adjacent membrane sheets is defined by either a feed spacer or a permeate spacer, wherein the membrane sheets are in alternating orientations such that the first major surface of each membrane sheet is in contact with a feed spacer and the second major surface of each membrane sheet is in contact with a permeate spacer.

Clause 13. The membrane module of clause 10, clause 11 or clause 12, wherein adjacent membrane sheets spaced apart by a feed spacer are sealed along the first and second sides of their first major surface to fluidly seal the fluid path for the flow of feed fluid and residue fluid along the first major surfaces, wherein adjacent membrane sheets spaced apart by a permeate spacer are sealed along their first and second ends of their second major surface to fluidly seal the fluid path for the permeate fluid along the second major surfaces, preferably wherein the adjacent membrane sheets spaced apart by a permeate spacer are also sealed along the second sides of their second major surface.

Clause 14. The membrane module of any one of clauses 10 to 13, wherein each feed spacer is configured to direct the flow of fluid along the first direction and each permeate spacer is configured to direct the flow of fluid along the second direction.

Clause 15. The membrane module of any preceding clause, wherein the area of the second portion is less than 20%, preferably less than 15%, more preferably less than 10%, most preferably less than 6% of the total area of the membrane sheet.

Clause 16. The membrane module of any preceding clause, wherein the permeance of the second portion for the major component is more than two times, preferably at least ten times the permeance of the first portion for the major component.

Clause 17. The membrane module of any preceding clause, wherein the second portion forms a part of the second major surface.

Clause 18. The membrane module of any preceding clause, wherein the second portion forms a part of the first major surface.

Clause 19. A method of manufacturing the membrane sheets of the membrane module of any one of clauses 1 to 18, the method comprising:
   providing a roll of precursor sheets;
   coating a first area of the roll of precursor sheets with a first coating solution and coating a second area of the roll of precursor sheets with a second coating solution to form the roll of membrane sheets,
   separating the one or more roll(s) of membrane sheets into separate membrane sheets, wherein the first portion of each membrane sheet is formed by the first area of the roll of membrane sheets and the second portion of each membrane sheet is formed by the second area of the roll of membrane sheets, wherein the second portion of each membrane sheet has a higher permeance for the major component than the first portion.

Clause 20. The method of clause 19, wherein the first area and the second area are adjacent to each other, preferably wherein the second area is positioned between two first areas such that in each membrane sheet, the second portion is formed as a strip and the first portions are provided on either side of the second portion.

Clause 21. The method of clause 18 or clause 19, wherein the method further comprises folding each membrane sheet around a feed spacer such that each membrane sheet forms a pair of membrane sheets.

Clause 22. The method of clause 18 or clause 19 further comprising sealing two membrane sheets together along the first side of their first major surface and positioning a feed spacer therebetween.

Clause 23. The method of any preceding clause, wherein the step of coating the first area and the step of coating the second area are performed simultaneously.

Clause 24. The method of any preceding clause, wherein the step of coating is performed by contacting the roll of membrane sheets with first and second solutions in a coating container, wherein the coating container has first and second sections fluidly separated from each other by separators, the first section containing the first coating solution and the second section containing the second coating solution.

Clause 25. The method of clause 24, wherein the second section of the coating container is positioned between two first sections of the coating container.

Clause 26. The method of clause 24 or clause 25, further comprising moving the position of the separators to adjust the position and size of the second portion.

Clause 27. A method of using a crossflow membrane module to separate a minor component from a feed flow comprising a major component and a minor component, wherein the residue fluid has a lower concentration of the minor component than the feed fluid and the permeate fluid has a higher concentration of the minor component than the feed fluid, preferably wherein the minor component is carbon dioxide and the major component is methane or nitrogen, wherein the module comprises:
   a housing having a first end and a second end, wherein the second end is spaced apart from the first end along a first direction,
   one or more membrane sheet(s) extending between the first and second ends of the housing, wherein each membrane sheet comprises a first end and a second end, wherein the second end is spaced apart from the first end along the first direction, wherein each membrane sheet comprises first and second sides extending between the first and second ends, wherein the first side is spaced apart from the second side along a second direction, wherein the second direction is transverse to the first direction, wherein each membrane sheet comprises a first major surface and a second major surface, wherein the second major surface is opposite from the first major surface,
   an inlet at the first end of the housing, wherein the inlet is in fluid communication with the first end of the first major surface of each membrane sheet;
   an outlet at the second end of the housing, wherein the outlet is in fluid communication with the second end of the first major surface of each membrane sheet; and
   a conduit adjacent to the first side of the second major surface of the membrane sheet;
   wherein at least one of the one or more membrane sheet(s) comprises a first portion and a second portion;
the method comprising:
   delivering a feed fluid comprising the major component and the minor component via the inlet to the first major surface of each membrane sheet such that it flows along the first major surface of each membrane sheet in the first direction;
   separating the feed fluid across each membrane sheet into the permeate fluid and the residue fluid such that the residue fluid flows along the first major surface in the first direction to the outlet and the permeate fluid flows along the second major surface in the second direction to the conduit;
   wherein the membrane module is configured such that the feed fluid and the residue fluid flow along the first major surface of each membrane sheet in the first direction but do not flow along the second major surface of each membrane sheet and the permeate fluid flows along the second major surface of each membrane sheet but does not flow along the first major surface of each membrane sheet;
   wherein the step of separating comprises separating the feed fluid across the first portion of the membrane sheet to generate a first part of the permeate fluid and separating the feed fluid across the second portion of the membrane sheet to generate a second part of the permeate fluid, wherein the second portion of the membrane sheet has a greater permeance for the major component than the first portion such that the second part of the permeate fluid has a higher concentration of the major component than the first part of the permeate fluid;
   wherein the second portion is spaced apart from the first side of the membrane sheet along the second direction thereby causing the second part of the permeate gas to flow towards the first side of the membrane sheet such that the second part of the permeate gas mixes with the first part of the permeate gas thereby reducing the concentration of the minor component in the first part of the permeate fluid;
   wherein the method further comprises outputting the residue fluid from the module via the outlet and outputting the permeate fluid from the module via the conduit.

The present invention may also be described by the following second set out clauses:

Clause 1. A membrane process for treating a gas or liquid feed mixture, said mixture comprising a minor component and a major component, the process comprising the steps of;
   (a) providing a flat sheet membrane having a feed side and a feed channel and a permeate side and a permeate channel;

(b) forming the membrane into a crossflow membrane module having a feed manifold, a residue manifold and at least one permeate manifold;

(c) the feed, residue and membrane permeate manifolds of (b) being arranged such that the flow of permeate in the permeate channel is predominantly in a direction at right angles to the flow of feed in the feed channel of the module;

(d) said membrane of (a) having two membrane areas permeable to the components of the feed mixture, a first membrane area being selective for the minor component over the major component of the feed mixture and a second membrane area having a higher permeance for the major component of the feed mixture than the first membrane area; the first and second membrane areas of the membrane being spaced such that the permeate from the second area passes through the permeate channel space of the first membrane area, and so produces a sweep effect on the first membrane area;

(e) passing the feed mixture from the feed manifold across the membrane of (a) and removing a treated feed mixture from the residue manifold, and concurrently removing a membrane permeate from the permeate manifold.

Clause 2. The process of clause 1, wherein the process is a gas separation process.

Clause 3. The process of clause 1, wherein the process is a pervaporation process.

Clause 4. The process of clause 1, wherein the membrane module in (b) is a spiral-wound module.

Clause 5. The process of clause 1, wherein the membrane module in (b) is a plate-and-frame module.

Clause 6. The process of clause 1, wherein the separation process is the separation of $CO_2$ from nitrogen.

Clause 7. The process of clause 1 wherein the separation process is the separation of light hydrocarbons C3 to C5 from nitrogen or methane.

Clause 8. The process of clause 1, wherein the separation process is the separation of $CO_2$ from hydrogen.

Clause 9. The process of clause 1, wherein the separation process is hydrogen from methane.

Clause 10. The process of clause 1, wherein the separation process is $CO_2$ from methane.

Clause 11. The process of clause 1, wherein the separation process is the separation of water from ethanol by pervaporation.

Clause 12. The process of clause 1, wherein the separation process is the separation of aromatics from aliphatic hydrocarbons by pervaporation.

Clause 13. The process of clause 1, wherein the membrane module in (b) used in the separation process operates at least in part within the pressure ratio limited region.

Clause 14. The process of clause 1, where the permeance and area of the second membrane area of (d) is such that the concentration of the minor component in the membrane permeate in (e) is equal or above the concentration of the permeate produced by a module of the same membrane area and configuration with no second membrane area.

Clause 15. The process of clause 1, wherein the permeance of the second membrane area of (d) to the major component of the feed mixture is at least twice the permeance of the first membrane area of (d) to the major component of the feed mixture.

Clause 16. The process of clause 1, wherein the permeance of the second membrane area of (d) to the major component of the feed mixture is at least ten times the permeance of the first membrane area of (d) to the major component of the feed mixture.

Clause 17. The process of clause 1, wherein the second membrane area of (d) is non-selective.

Clause 18. The process of clause 1, wherein the second membrane area of (d) has the form of an elongated strip that is oriented parallel to the general direction of the feed flow and positioned so as to be on the edge of the flat membrane sheet opposite to the permeate manifold.

Clause 19. The process of clause 1, wherein the crossflow module of (b) has two permeate manifolds and the second membrane area of (d) has the form of an elongated strip that is oriented parallel to the general direction of the feed flow and positioned in the middle portion of the first membrane area so that the permeate from the second membrane area passes through the permeate channel space of the first membrane area to each of the two permeate manifolds.

Clause 20. A method of manufacturing flat sheet membrane modules useful for separating a gas or liquid mixture of a minor component and a major component, the method comprising;

(a) forming a roll of membrane, the membrane having a first membrane area being selective for the minor component of the feed over the major component of the feed, and a second membrane area having a higher permeance for the major component of the feed than the first membrane area;

(b) forming the membrane rolls of (a) into membrane sheets of defined geometry and packaging the sheets into flat sheet membrane modules having feed channel space connected to a feed manifold and a residue manifold, and permeate channel spaces connected to at least one permeate manifold;

(c) the feed and residue manifold manifolds being arranged so as to produce a generally straight flow path from the feed to the residue manifolds through the feed channel;

(d) the permeate manifold and the second membrane area being positioned such that the permeate flow through the second membrane area produces a crossflow, or a partially counterflow sweep effect on the first area of the membrane.

Clause 21. The method of clause 20, wherein the membrane module in (b) is a spiral wound module.

Clause 22. The method of clause 20, wherein the membrane module in (b) is a plate-and-frame module.

Clause 23. The method of clause 20, where the permeance and area of the second membrane area of (d) is such that the concentration of the minor component in the membrane permeate in (e) is above the concentration of the permeate produced by a module of the same membrane area and configuration with no second membrane area.

Clause 24. The method of clause 20, wherein the permeance of the second membrane area of (d) to the major component of the feed mixture is at least twice the permeance of the first high selectivity membrane of (d) to the major component of the feed mixture.

Clause 25. The method of clause 20, wherein the permeance of the second membrane area of (d) to the major component of the feed mixture is at least ten times the permeance of the first high selectivity membrane of (d) to the major component of the feed mixture.

Clause 26. The method of clause 20, wherein the second membrane are of (d) has the form of an elongated strip oriented parallel to the general direction of the feed flow and positioned so as to be at the edge of the flat membrane sheet opposite to the permeate manifold.

Clause 27. The method of clause 20, wherein the crossflow module of (b) has two permeate manifolds and the second membrane area of (d) has the form of an elongated strip oriented parallel to the general direction of the feed flow and positioned in the middle portion of the first membrane area so that the permeate from the second membrane area passes through the permeate channel space of the first membrane area to each of the two permeate manifolds.

Clause 28. The method of clause 20, wherein the second membrane area of (d) has the form of an elongated strip oriented at right angles to the general direction of the feed flow and positioned so as to be at the edge of the flat membrane sheet adjacent to the feed channel residue manifold.

Clause 29. The method of clause 20, wherein flow-directing baffles are incorporated into the permeate channel space arranged to enhance the sweep flow of the permeate in (d) counter to the flow through the feed channel in (c).

The invention claimed is:

1. A plate and frame crossflow membrane module configured to separate feed fluid comprising a minor component and a major component into permeate fluid and residue fluid, wherein the residue fluid has a lower concentration of the minor component than the feed fluid and the permeate fluid has a higher concentration of the minor component than the feed fluid, the plate and frame module comprising:
   a housing having:
      a first end and a second end, wherein the second end is spaced apart from the first end along a first direction; and
      a first side and a second side, wherein the first side is spaced apart from the second side along a second direction which is transverse to the first direction,
   one or more membrane sheet(s) extending between the first and second ends of the housing and the first and second sides of the housing, wherein each membrane sheet comprises a first end and a second end, wherein the second end is spaced apart from the first end along the first direction, wherein each membrane sheet comprises first and second sides extending between the first and second ends, wherein the first side is spaced apart from the second side along the second direction, wherein each membrane sheet comprises a first major surface and a second major surface, wherein the second major surface is opposite from the first major surface, wherein each membrane sheet is configured to separate the feed fluid into the residue fluid and the permeate fluid,
   wherein the membrane module is configured such that the feed fluid and the residue fluid flow along the first major surface of each membrane sheet in the first direction but do not flow along the second major surface of each membrane sheet and the permeate fluid flows along the second major surface of each membrane sheet but does not flow along the first major surface of each membrane sheet;
   the membrane module further comprising:
   an inlet at the first end of the housing, wherein the inlet is in fluid communication with the first end of the first major surface of each membrane sheet and is configured to deliver the feed fluid such that it flows along the first major surface of each membrane sheet;
   an outlet at the second end of the housing, wherein the outlet is in fluid communication with the second end of the first major surface of each membrane sheet and is configured to receive and output the residue fluid separated from the feed fluid; and
   a conduit adjacent to the first side of the second major surface of the membrane sheet, wherein the conduit is configured to receive and output the permeate fluid separated from the feed fluid;
   wherein at least one of the one or more membrane sheet(s) comprises a first portion and a second portion such that separation of the feed fluid across the first portion generates a first part of the permeate fluid and separation across the second portion generates a second part of the permeate fluid,
   wherein the second portion of the membrane sheet has a greater permeance for the major component than the first portion such that the second part of the permeate fluid has a higher concentration of the major component than the first part of the permeate fluid; and
   wherein the second portion is spaced apart from the first side of the membrane sheet along the second direction thereby causing the second part of the permeate fluid to flow towards the first side of the membrane sheet such that the second part of the permeate fluid mixes with the first part of the permeate fluid thereby reducing the concentration of the minor component in the first part of the permeate fluid.

2. The membrane module of claim 1, wherein the conduit extends along at least 50% of the length of the first side of the one of more membrane sheet(s) in the first direction.

3. The membrane module of claim 1, wherein the conduit is aligned with the first side of each membrane sheet.

4. The membrane module of claim 1, wherein the module further comprises a second conduit, wherein the second conduit is in fluid communication with the second side of the one or more membrane sheet(s), wherein the second conduit is configured to receive and output the permeate fluid separated from the feed fluid, wherein the second portion is spaced apart from both the first side and the second side of the one of more membrane sheet(s) along the first direction.

5. The membrane module of claim 1, wherein the second portion extends along the first direction between the first end and the second end.

6. The membrane module of claim 1, wherein the second portion of the one or more membrane sheet(s) extends along an outer edge of the one or more membrane sheet(s).

7. The membrane module of claim 6, wherein the second portion extends along at least a portion of the second side of the one or more membrane sheet(s).

8. The membrane module of claim 1, wherein the module further comprises:
   one or more feed spacers configured to space apart the one or more membrane sheets wherein each feed spacer is for defining a fluid path for the flow of feed fluid and residue fluid to the outlet; and
   one or more permeate spacers configured to space apart the one or more membrane sheets, wherein each permeate spacer is for defining a fluid path for the flow of permeate fluid to the conduit.

9. The membrane module of claim 8, wherein a first membrane sheet of the one or more membrane sheets is arranged such that a feed spacer is adjacent to the first major surface of the first membrane sheet and a permeate spacer is adjacent to the second major surface of the first membrane sheet.

10. The membrane module of claim 8 wherein the membrane sheets, the one or more feed spacers and the one or more permeate spacers are arranged in a stacked configuration, wherein each space between adjacent membrane sheets is defined by either a feed spacer or a permeate spacer, wherein the membrane sheets are in alternating orientations such that the first major surface of each membrane sheet is in contact with a feed spacer and the second major surface of each membrane sheet is in contact with a permeate spacer.

11. The membrane module of claim 8, wherein adjacent membrane sheets spaced apart by a feed spacer are sealed along the first and second sides of their first major surface to fluidly seal the fluid path for the flow of feed fluid and residue fluid along the first major surfaces, wherein adjacent membrane sheets spaced apart by a permeate spacer are sealed along their first and second ends of their second major surface to fluidly seal the fluid path for the permeate fluid along the second major surfaces.

12. The membrane module of claim 8, wherein each feed spacer is configured to direct the flow of fluid along the first direction and each permeate spacer is configured to direct the flow of fluid along the second direction.

13. The membrane module of claim 1, wherein the area of the second portion is less than 10% of the total area of the membrane sheet.

14. The membrane module of claim 1, wherein the permeance of the second portion for the major component is more than two times the permeance of the first portion for the major component, wherein the major component is one of: $CH_4$, $CO_2$, $H_2$, Isopropanol, Acrylonitrile, Methyl Cyclohexane, or $H_2O$.

15. The membrane module of claim 1, wherein the second portion forms a part of the second major surface.

16. The membrane module of claim 1, wherein the second portion forms a part of the first major surface.

17. A method of manufacturing the membrane sheets of the membrane module of claim 1, the method comprising:
providing a roll of precursor sheets;
coating a first area of the roll of precursor sheets with a first coating solution and coating a second area of the roll of precursor sheets with a second coating solution to form the roll of membrane sheets,
separating the roll of membrane sheets into separate membrane sheets, wherein the first portion of each membrane sheet is formed by the first area of the roll of membrane sheets and the second portion of each membrane sheet is formed by the second area of the roll of membrane sheets, wherein the second portion of each membrane sheet has a higher permeance for the major component than the first portion.

18. The method of claim 17, wherein the first area and the second area are adjacent to each other.

19. The method of claim 17, wherein the method further comprises folding each membrane sheet around a feed spacer such that each membrane sheet forms a pair of membrane sheets.

20. The method of claim 17 further comprising sealing two membrane sheets together along the first side of their first major surface and positioning a feed spacer therebetween.

21. The method of claim 17, wherein the step of coating the first area and the step of coating the second area are performed simultaneously.

22. The method of claim 17, wherein the step of coating is performed by contacting the roll of membrane sheets with first and second solutions in a coating container, wherein the coating container has first and second sections fluidly separated from each other by separators, the first section containing the first coating solution and the second section containing the second coating solution.

23. The method of claim 22, wherein the second section of the coating container is positioned between two first sections of the coating container.

24. The method of claim 22, further comprising moving the position of the separators to adjust the position and size of the second portion.

25. The membrane of claim 13, wherein the area of the second portion is less than 6% of the total area of the membrane sheet.

26. The membrane module of claim 1, wherein the area of the second portion is between 1% and 14% of the total area of the membrane sheet.

27. A pervaporation or gas separation crossflow membrane module configured to separate feed fluid comprising a minor component and a major component into permeate fluid and residue fluid, wherein the residue fluid has a lower concentration of the minor component than the feed fluid and the permeate fluid has a higher concentration of the minor component than the feed fluid, the module comprising:
a housing having a first end and a second end, wherein the second end is spaced apart from the first end along a first direction,
one or more pervaporation or gas separation membrane sheet(s) extending between the first and second ends of the housing, wherein each membrane sheet comprises a first end and a second end, wherein the second end is spaced apart from the first end along the first direction, wherein each membrane sheet comprises first and second sides extending between the first and second ends, wherein the first side is spaced apart from the second side along a second direction, wherein the second direction is transverse to the first direction, wherein each membrane sheet comprises a first major surface and a second major surface, wherein the second major surface is opposite from the first major surface, wherein each membrane sheet is configured to separate the feed fluid into the residue fluid and the permeate fluid,
wherein the membrane module is configured such that the feed fluid and the residue fluid flow along the first major surface of each membrane sheet in the first direction but do not flow along the second major surface of each membrane sheet and the permeate fluid flows along the second major surface of each membrane sheet but does not flow along the first major surface of each membrane sheet;
the membrane module further comprising:
an inlet at the first end of the housing, wherein the inlet is in fluid communication with the first end of the first major surface of each membrane sheet and is configured to deliver the feed fluid such that it flows along the first major surface of each membrane sheet;
an outlet at the second end of the housing, wherein the outlet is in fluid communication with the second end of the first major surface of each membrane sheet and is configured to receive and output the residue fluid separated from the feed fluid; and
a conduit adjacent to the first side of the second major surface of the membrane sheet, wherein the conduit is configured to receive and output the permeate fluid separated from the feed fluid;
wherein at least one of the one or more membrane sheet(s) comprises a first portion and a second portion such that separation of the feed fluid across the first portion generates a first part of the permeate fluid and separation across the second portion generates a second part of the permeate fluid,
wherein the second portion of the membrane sheet has a greater permeance for the major component than the first portion such that the second part of the permeate fluid has a higher concentration of the major component than the first part of the permeate fluid;

wherein the second portion is spaced apart from the first side of the membrane sheet along the second direction thereby causing the second part of the permeate fluid to flow towards the first side of the membrane sheet such that the second part of the permeate fluid mixes with the first part of the permeate fluid thereby reducing the concentration of the minor component in the first part of the permeate fluid.

28. The crossflow membrane module of claim 27, wherein the crossflow membrane module is spiral-wound, wherein the conduit is a central tube extending along the first direction, wherein the one or more membrane sheet(s) are wound around the central tube so as to define a spiral perpendicular to the first direction, such that the first side of the one or more membrane sheet(s) is closer to the central tube than the second side, wherein the central tube comprises a cylindrical surface and first and second terminal ends defining a lumen therebetween, wherein the central tube comprises one or more opening(s) in the cylindrical surface, wherein the one or more opening(s) are configured to receive the permeate fluid separated from the feed fluid, wherein the one or more opening(s) are in fluid communication with the first side of the membrane sheer, wherein the central tube further comprises an outlet configured to output the permeate fluid received by the one or more opening(s), and wherein the outlet is in the first or second terminal ends of the central tube.

29. The membrane module of claim 28, wherein the one or more opening(s) are spaced apart from each other along the first direction.

* * * * *